(12) United States Patent
Brain et al.

(10) Patent No.: US 7,600,243 B2
(45) Date of Patent: Oct. 6, 2009

(54) USER INTERFACE METHODS AND SYSTEMS FOR DEVICE-INDEPENDENT MEDIA TRANSACTIONS

(75) Inventors: Cameron W. Brain, Troy, NY (US); Michael P. Rabinovich, Troy, NY (US)

(73) Assignee: Open Box Technologies, Inc., Troy, NY (US)

( * ) Notice: Subject to any disclaimer, the term of this patent is extended or adjusted under 35 U.S.C. 154(b) by 441 days.

(21) Appl. No.: 11/392,259

(22) Filed: Mar. 29, 2006

(65) Prior Publication Data

US 2006/0236243 A1 Oct. 19, 2006

Related U.S. Application Data

(60) Provisional application No. 60/669,294, filed on Apr. 6, 2005, provisional application No. 60/756,251, filed on Jan. 3, 2006.

(51) Int. Cl.
G06F 3/00 (2006.01)
G06F 13/00 (2006.01)
H04N 5/445 (2006.01)

(52) U.S. Cl. .............................. 725/44; 725/45; 725/52; 725/61

(58) Field of Classification Search ................... 725/44, 725/45, 52, 53, 87, 101, 104, 61
See application file for complete search history.

(56) References Cited

U.S. PATENT DOCUMENTS

| | | | | | |
|---|---|---|---|---|---|
| 5,583,560 | A | * | 12/1996 | Florin et al. ................. | 725/104 |
| 5,694,176 | A | * | 12/1997 | Bruette et al. ................. | 725/45 |
| 6,057,872 | A | | 5/2000 | Candelore ..................... | 348/3 |
| 6,314,570 | B1 | * | 11/2001 | Tanigawa et al. ............. | 725/40 |
| 6,577,350 | B1 | * | 6/2003 | Proehl et al. ................... | 725/39 |
| 6,802,077 | B1 | | 10/2004 | Schlarb ........................ | 725/104 |
| 7,293,275 | B1 | * | 11/2007 | Krieger et al. ................ | 725/52 |
| 2002/0059603 | A1 | * | 5/2002 | Kelts ............................ | 725/47 |
| 2002/0069265 | A1 | | 6/2002 | Bountour et al. | |

(Continued)

OTHER PUBLICATIONS

Helix Player Architecture, URL=https://player.helixcommunity.org/2005/dev/arch.html, download date May 9, 2007.

(Continued)

*Primary Examiner*—Christopher Kelley
*Assistant Examiner*—Randy Flynn
(74) *Attorney, Agent, or Firm*—Black Lowe & Graham PLLC

(57) ABSTRACT

Methods, systems, techniques, and computer-readable media for device-independent media transactions, such as the transaction, acquisition, presentation, and publication of media, are provided. Example embodiments provide a Device Independent Video Transaction System ("DIVTS"), which enables a user to transact for media such as streamed video on any device that can receive streamed data over a broadband connection and output video data to a display. In one embodiment, the DIVTS comprises a user interface which is based upon a "quilt" metaphor and is configured to present a uniform mechanism for specifying media to be acquired, directing the presentation of acquired media, and initiating transactions related to the specified media. This abstract is provided to comply with rules requiring an abstract, and it is submitted with the intention that it will not be used to interpret or limit the scope or meaning of the claims.

53 Claims, 32 Drawing Sheets

U.S. PATENT DOCUMENTS

2006/0015580 A1     1/2006    Gabriel et al.
2008/0165752 A1     7/2008    Perlman

OTHER PUBLICATIONS

The Helix DNA Client, URL=https://helix-client.helixcommunity.org/2005/about/, download date Feb. 24, 2006.

Helix DNA Client Overview, URL=https://client.helixcommunity.org/2003/devdocs/intro/client_intro.htm, download date May 9, 2007.

Helix Player Downloads, URL=https://player.helixcommunity.org/2005/downloads/, download date Feb. 27, 2006.

RealPlayer—Free Download, URL=http://www.real.com/freeplayer/?rppr=rnwk, download date Feb. 24, 2006.

RealPlayer 10 for Linux is here, URL=http://www.real.com/linux, download date May 9, 2007.

Realplayer for Mobile, URL=http://www.realnetworks.com/industries/serviceproviders/mobile/products/player/index.html download date Feb. 24, 2006.

New RealPlayer 10 for Mac OS X, URL=http://www.real.com/mac, download date May 9, 2007.

* cited by examiner

USER INTERFACE METHODS AND SYSTEMS FOR DEVICE-INDEPENDENT MEDIA TRANSACTIONS

TECHNICAL FIELD

The present disclosure relates to methods and systems for media transactions and, in particular, to methods and systems for facilitating the transaction, acquisition, presentation, and publication of media in a device-independent manner.

BACKGROUND

The proliferation of digital, broadband network access has given rise to various technologies for the delivery of a wide variety of media content. Such technologies include proprietary set top boxes that operate over closed networks, such as those operated by cable companies, to receive and decode digital and/or analog content for display on television sets. Other technologies include portable media devices and software media players. Software media players typically operate over open networks such as the Internet to receive and decode digital content for display on display devices attached to computing systems such as desktop computers, laptops, or mobile phones. Portable media devices can store and display or play digital content obtained from a host computing system.

The set top box model of media distribution suffers from a variety of shortcomings. First, set top boxes typically operate on closed networks. That is, the consumer is limited to the media selections provided by the owner of the network, generally a cable company. The consumer is therefore faced with monopoly pricing for limited choices of media content. In addition, the set top box model of content distribution is inherently unidirectional and consumption-based. That is, consumers are passive in their consumption, with their only interaction being to choose from one of the various offerings selected by the operator of the network. Consumers are generally not able to utilize the set top box for interacting meaningful way, such as by sharing their own content and/or providing reviews and/or ratings for media they have accessed.

The software media player model of media distribution also suffers from multiple shortcomings. First, as with set top boxes, users assume a passive role in the consumption of media content. Users may select from a number of media offerings, but have little or no ability to provide meaningful feedback or perform other interactions related to the media they consume. If users wish to interact in such ways, they must often resort to other software systems (e.g., Web browsers) that may not be well integrated with the particular media player they are using. In addition, standards wars between proponents of various media distribution standards have resulted in a fractured marketplace of often-incompatible media players. In some cases, users must install several media players in order to access media content that is provided in various, incompatible standards.

In addition, the portable media device model of distribution suffers from various shortcomings. First, portable media devices do not typically provide direct access to streaming content over broadband connections. Instead, they rely on host computing systems, such as desktop personal computers, to download music and/or video from content sources for further transfer to the portable media device. As such, when a portable media device is disconnected from its host system, the selection of content it provides to its user is effectively static. In addition, due to the intermediation of the host computing system, users are faced with the task of learning to use an additional software system on the host computing system for building and managing a media library that exists for the primary purpose of providing content to the portable media device.

Furthermore, the problem of non-uniformity cuts across the various approaches to media distribution. Modern households have numerous devices that may be used to consume media in one form or another, including personal computers, laptop computers, personal digital assistants, cellular telephones, and televisions. However, in order to consume media, users must learn to utilize a specialized interface for each device, sometimes at considerable cost of time, money, and/or frustration. There does not exist a single, uniform interface that a user can utilize in order to operate all of these devices in order to consume and interact with media content in a meaningful, truly interactive manner.

DETAILED DESCRIPTION

Figure 1:
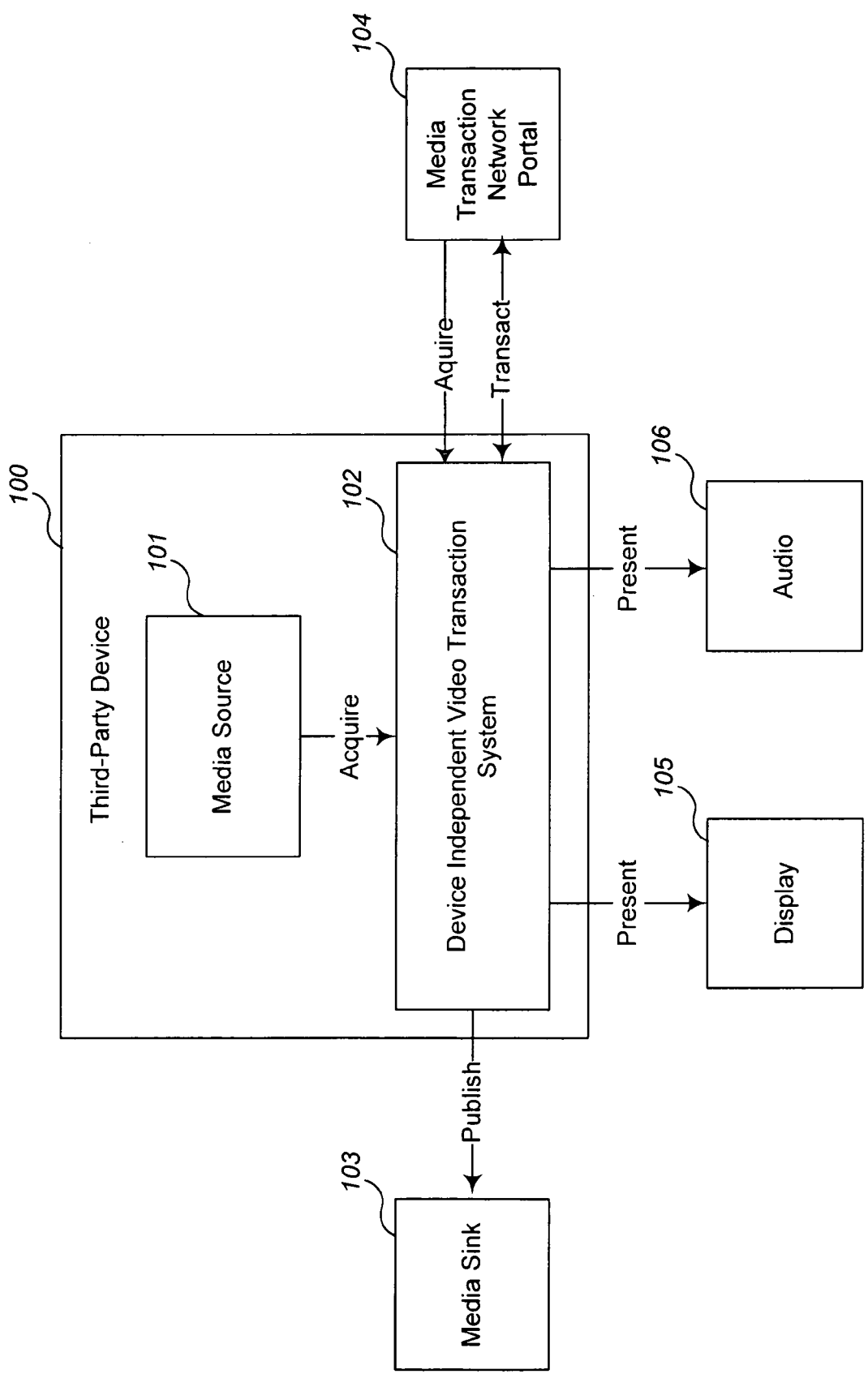
FIG. 1 is an example block diagram of an example embodiment of a Device-Independent Video Transaction System residing on a third-party device.

Embodiments described herein provide methods and systems for performing device-independent media transactions, such as the transaction, acquisition, presentation, and publication of media. Example embodiments provide a Device Independent Video Transaction System ("DIVTS"), which enables a user to transact for media such as streamed video on any device that can receive streamed data over a broadband connection and that can output the media data to a display. Media includes audio, text, video, still images and other forms of information in any of a variety of genres or forms, including films, documentaries, books, magazines, news sources, reference materials, etc. The term "media" as used herein also includes one or more logical or physical groupings and/or arrangements of information, such as a media item, a media title, a content item, or a media selection. In addition, one or more media items may be arranged or otherwise grouped into media catalog or other aggregation or collection. By installing a DIVTS on a third-party device, such a device becomes DIVTS-enabled. Note that the terms "DIVTS-enabled," "media-enabled," "video-enabled," etc. refer in various contexts to a device that has been configured to transact with the media. Because DIVTS embodiments are device-independent and may be provided for many different hardware operating environments (e.g., personal computers running various operating systems, video game systems, personal digital assistants, cellular telephones, etc.), users need only learn a single, uniform user interface for performing a wide variety of rich media interactions.

Some embodiments of a DIVTS provide a user interface based upon a "quilt" metaphor that is configured to present a uniform mechanism for specifying media to be acquired, directing the presentation of acquired media, and initiating transactions related to the specified media. The interface is capable of being operated with a minimal set of input modalities and with various display devices, which enhances its degree of platform and/or device independence. Because the quilt user interface provides a singular, uniform interface for interacting with any instance of a DIVTS operating on any device, a user need only learn a single interface to perform a rich set of media transactions.

Using a DIVTS-enabled device, a user can transact for media, which includes performing financial transactions (e.g., buying, renting, subscribing) in order to obtain rights to access media titles. Transacting further includes obtaining (e.g., by searching, browsing, etc.) meta-information related to media titles, such as reviews, synopses, still images, etc. Furthermore, transacting includes performing financial transactions in order to obtain goods and/or services that are portrayed in or suggested by media titles and/or meta-information related to media titles. Such goods and/or services may include, for example, clothing items or accessories worn by an actor in a particular media title, items portrayed in advertisements associated with particular a media title, products endorsed in the context of a review of a particular media title, etc. In addition, a user may utilize a DIVTS-enabled device in order to acquire media titles for purposes of presentation (e.g., display and/or playback) on the device. Furthermore, in some embodiments, a user may utilize a DIVTS-enabled device in order to publish (e.g., share) media content that they may have stored (e.g., digital video stored on a home computer) or otherwise made available (e.g., a Web or Internet camera) in a home or other network.

Multiple DIVTS interacting via a network with other producers and consumers of media may in some embodiments form a Media Transaction Network ("MTN"). A DIVTS that interacts via the network may be used to acquire media from a variety of media sources. A media source includes any device or system that is capable of providing media data whether accessible via a network or not, such as streaming media servers, Web servers, FTP servers, hard disks or other computer readable media storage devices, network cameras, etc. In addition, a DIVTS may be used to publish and thereby provide access to media that is available from media sources to various media sinks. A media sink includes any device or system that is capable of consuming media, such as a software media player or another DIVTS. As part of the MTN, a DIVTS may make media available that otherwise would not have been accessible (e.g., because the media is resident on a file system that is not available to the network at large) to other devices (including non-DIVTS-enabled devices) or systems on the MTN.

FIG. 1 is an example block diagram of an example embodiment of a Device Independent Video Transaction System resident on a third-party device. In the illustrated embodiment, the third-party device 100 includes a media source 101 and a Device Independent Video Transaction System ("DIVTS") 102. The third-party device 100 can be any device that is capable of streaming or otherwise presenting media to a display and acquiring media over a high speed network connection (e.g., a broadband Internet connection). The DIVTS 102 interacts with the media source 101, a media sink 103, a Media Transaction Network Portal ("MTNP") 104, a display device 105, and an audio device 106 to provide media and transactions related thereto to a user of a third-party device 100.

In particular, the DIVTS 102 acquires media from the media source 101 as well as an MTNP 104. Acquiring media may include obtaining digital and/or analog data with information content that may be presented as images, sound, text, symbols, or other forms perceptible by the human senses via a network, data bus, or other communication mechanism. In the illustrated example, the DIVTS 102 acquires media from the media source 101, which is shown resident on the third-party device 100. As such, the media source 101 may be a hard drive, optical drive, or other storage device or subsystem capable of providing media to the DIVTS 102. In addition, media sources may be remotely located, as illustrated by the MTNP 104, which can provide media to the DIVTS 102 via a network (not shown) or other communications interconnect.

The DIVTS 102 further transacts for media and meta-information and items related to such media (media-related items) using the MTNP 104. Media transacting may include purchasing, renting, subscribing, licensing or otherwise obtaining rights to media, media-related meta-information, and/or media-related items. Media-related meta-information may include information related to media that may be acquired, such as media publication information (e.g., title, publisher, director, producer, actors, etc.), reviews, synopses, still photographs, etc. Media-related items may include goods and/or services that are portrayed by media (e.g., a pair of sunglasses worn by an actor in a movie), suggested by portrayed media (e.g., a kitchen utensil endorsed by a cooking show), as well as described in or depicted by media-related meta-information (e.g., an advertisement provided along with acquired media, a fan club for an actor promoted by a movie review, etc.). Typical media transactions may include such operations as performing searches and obtaining search results for media to acquire; obtaining reviews and/or previews of a media; purchasing, renting, or subscribing to a media item; purchasing merchandise portrayed in or related to a media item; and providing a review of a media item.

In addition, the DIVTS 102 presents media to the display device 105 and/or the audio device 106. Media presentation may include preparing media for output as well as initiating output of media by any output device capable of transforming digital and/or analog media data into a signal or other impulse detectable by a human, including electromagnetic waves, audio waves, and chemicals perceptible by taste or smell, or tactile impulses. In the illustrated example, the DIVTS 102 presents image data from an acquired video media item to the display device 105 (e.g., Cathode Ray Tube ("CRT") or Liquid Crystal Display ("LCD")) for visual perception by the eyes of a human viewer as well as presents audio data from the acquired video media item to the audio device 106 (e.g., speakers or headphones) for aural perception by the ears of a human viewer.

In some embodiments, the DIVTS 102 may also publish media to the media sink 103. Media publication includes providing media such that it may be obtained or retrieved by a media sink or other consumer of media for purposes such as presentation. Media publication can include providing media items themselves, as well as metadata related to such media items, including indications (e.g., URLs ("Uniform Resource Locators") or URIs ("Uniform Resource Indicators")) of the location from where such media items may be obtained as well as the mechanisms by which such media items are distributed or otherwise communicated. In the illustrated example, the DIVTS 102 publishes media (e.g., a self-produced video such as a home movie) to the media sink 103. The media sink 103 may be, for example, a video player that obtains the published media via a network for purposes of display upon a remote display device.

Figure 2:
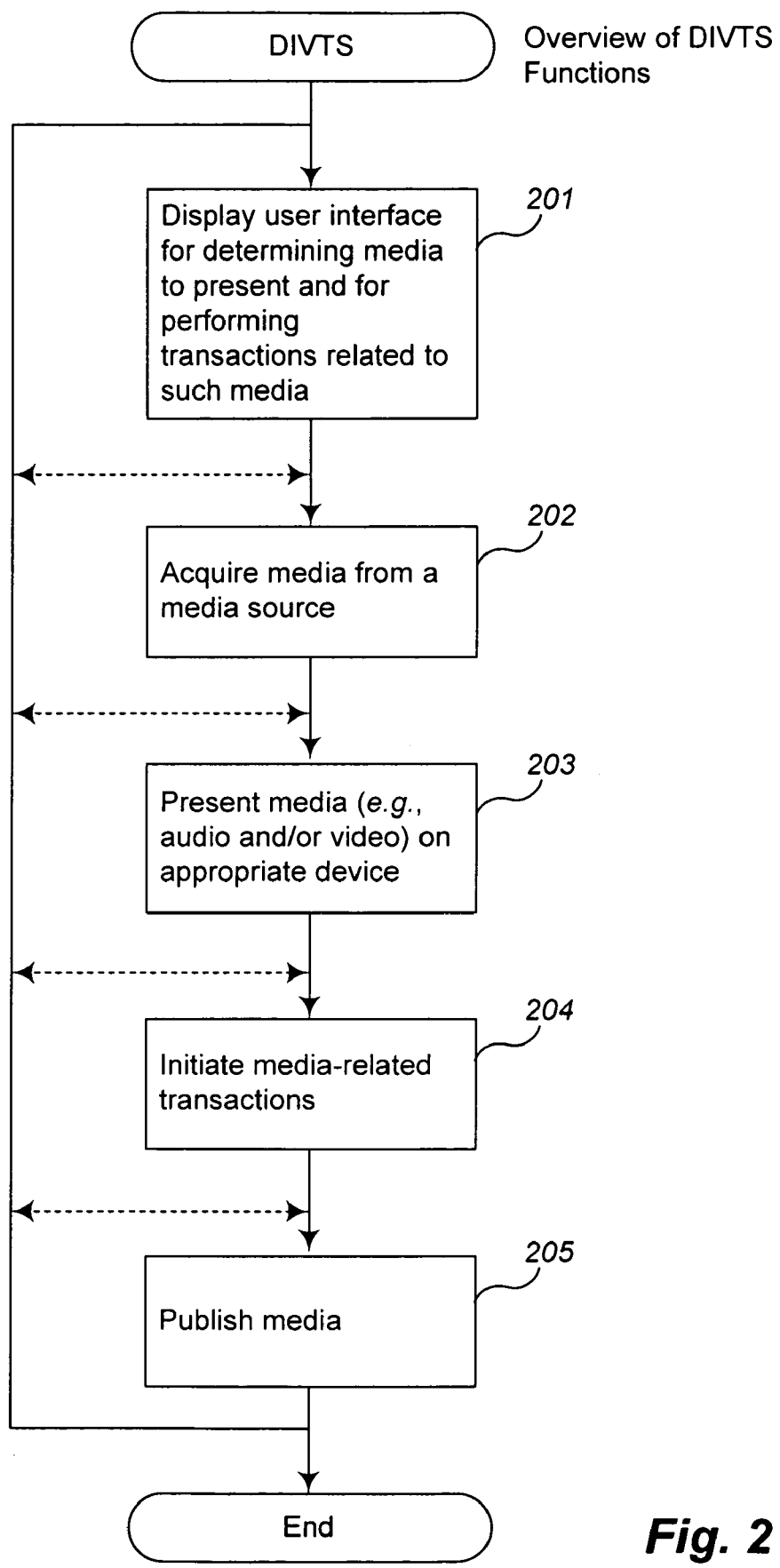
FIG. 2 is an example block diagram of an overview of an example process for providing functions of a Device Independent Video Transaction System.

FIG. 2 is an example block diagram of an overview of an example process for providing functions of a Device Independent Video Transaction System. A DIVTS, such as DIVTS 102, provides support for numerous functions as described with reference to FIG. 1. Although these functions are described in FIG. 2 as separate steps, one will recognize that the functions may be performed in any order and from one function the flow might progress to any other function dependent typically upon the desires of a user operating the device. In step 201, the DIVTS displays a user interface for determining what media to present and for performing transactions related to such media. In step 202, the DIVTS then acquires media from a media source. The media may be acquired from any media source, including local and/or remote sources. Examples include such things as media from local storage devices (e.g., hard disks, optical drives, etc.) and media accessed over a broadband connection or over a computer network (e.g., from a Web server or streaming video server). In step 203, the DIVTS presents the acquired media on an appropriate device, such as a device that is configured to present audio (e.g., head phones, speakers, etc.) and/or video (e.g., CRT or LCD display devices). In step 204, the DIVTS initiates media-related transactions. Such transactions may relate, for example, to buying or otherwise acquiring, purchasing, renting, subscribing to entities or commodities, or other goods and/or services that might relate to the media being presented. In step 205, the DIVTS supports the publishing of media to other systems and/or users. Note that, after each of these steps, the DIVTS may return to any of the other prior steps to perform any of the functions described with reference to steps 201-205. After the DIVTS is no longer performing any such functions, such as when the user shuts off the device, the DIVTS process ends.

Figure 3:
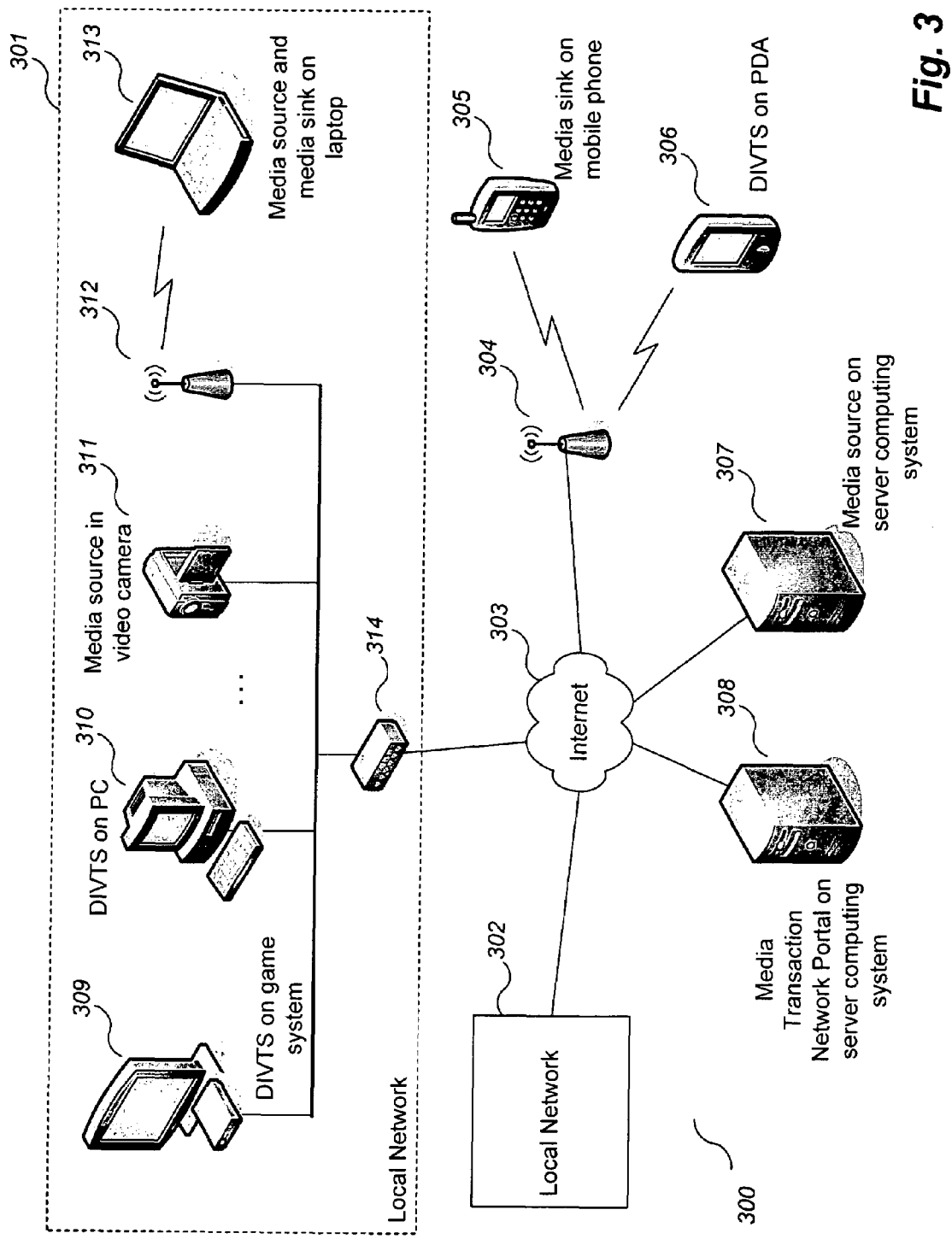
FIG. 3 is an example network diagram depicting a Media Transaction Network.

In an embodiment where more than one media-enabled device exists, the media-enabled devices may co-exist in a network environment to promote the sharing and access to media. FIG. 3 is an example network diagram depicting a Media Transaction Network. A Media Transaction Network ("MTN") comprises one or more devices, some of which may be media-enabled and others not, which are interconnected by one or more networks. For example, the illustrated MTN 300 includes a first local network 301, a second local network 302, a media sink resident on a mobile phone 305, a DIVTS on a personal digital assistant ("PDA") 306, a MTNP resident on a server computing system 308, a media source resident on a server computing system 307, and a connection to a plurality of other devices 309-313 via the first local network 301. The mobile phone 305 and PDA 306 are connected to the MTN 300 via a wireless network access gateway 304. A wireless network access gateway comprises any device that enables a network capable device to communicate by use of electromagnetic signals (e.g., radio waves, microwaves, infrared, etc.) with other network capable devices without, or in addition to, the use of fixed wires or cables. Wireless network access gateways 304 may include, for example, cellular telephone installations, wireless routers, packet radio systems, infrared transceivers, etc. The various illustrated devices, computing systems, and networks are communicatively coupled connected via an internetwork 303 such as the Internet.

In the illustrated example, the first local network 301 includes such devices as a DIVTS resident on a game system 309, a DIVTS resident on a desktop personal computer ("PC") 310, a media source resident on a non-DIVTS enabled video camera 311, and a media source and a media sink resident on a non-DIVTS enabled laptop computer 313. The illustrated non-DIVTS enabled video camera 311 provides a communication interface (e.g., a USB ("Universal Serial Bus") interface, an IP ("Internet Protocol") accessible video data service, etc.) that may be accessed by other computing devices. In addition, the laptop computer 313 is shown connected to the first local network 301 via a wireless network access gateway 312. The local network 301 is shown connected to the MTN 300 via a network gateway 314. The network gateway 314 may be, for example, a modem, a cable modem, a digital subscriber line ("DSL") modem, router, or any other device or subsystem capable of connecting local network 301 to the internetwork 303.

Thus, the illustrated MTN is an "ecosystem" of devices and/or computing systems that may cooperate to acquire, transact, present, and publish media. For example, the local network 301 illustrates a typical home network that may include multiple devices and/or computing systems that may be configured by a user to acquire, transact, present, and view media. The DIVTS residing on the personal computer 310 may be utilized to publish media local to the personal computer 310 as well as media from a non-DIVTS enabled device such as the video camera 311. In so doing, the user can make media available to both DIVTS and non-DIVTS enabled devices internal and external to the local network 301. For example, the user may utilize the DIVTS residing on the game system 409 or the media sink residing on the laptop 313 to acquire and/or present media published by the DIVTS residing on personal computer 310. In addition, a user may utilize the media sink (e.g., an instance of a media player such as the RealPlayer™ media player) on the mobile phone 305 or the DIVTS on the PDA 306 to acquire and/or present media published by the DIVTS residing on the personal computer 310 even though the devices 305 and 306 are external to the local network 301 and would ordinarily not be capable of accessing media resident on, for example, a hard drive local the personal computer 310 or provided by, for example, a video camera 311. Thus, one or more DIVTS-enabled devices operating on a network provide "glue" functionality that facilitates the sharing and presentation of media available from various sources with various other media consuming devices on the network that may otherwise not be capable of accessing media from such sources.

In some embodiments, a user may specify access rights that may be used to limit the devices and/or users that may have access to published media. For example, the user of the DIVTS resident on the PC 310 may publish video provided by the media source in the video camera 311, but may also limit access to such media by specifying access rights that allow access by, for example, any device operating on the local network 301 as well as the DIVTS on the PDA 306, but not any other device in the illustrated MTN 300.

Example embodiments described herein provide applications, tools, data structures and other support to implement a DIVTS, a quilt-based user interface, and/or a MTNP to be used for the transaction, acquisition, presentation, and publication of media, in particular video-based media titles. Other embodiments of the described techniques may be used for other purposes, including the distribution of other types of media, including audio books, podcasts, electronic books (e.g., eBooks), educational materials, newspapers, newsmagazines, etc. In addition, the quilt metaphor may be used to provide a device-independent, uniform mechanism for invoking various functionality sets, including Web browsing, document preparation, information organization and presentation (e.g., encyclopedias), database front-ends, etc.

Also, although certain terms are used primarily herein, one skilled in the art will recognize that other terms could be used interchangeably to yield equivalent embodiments and examples. For example, the terms "video," "audiovisual," "movie," "film," and other similar terms etc. may be used to refer to media content that contains images and/or text and/or audio portions. In addition, terms may have alternate spellings which may or may not be explicitly mentioned, and one skilled in the art will recognize that all such variations of terms are intended to be included. In the following description, numerous specific details are set forth, such as data formats and code sequences, etc., in order to provide a thorough understanding of the described techniques. However, the present techniques also can be practiced without some of the specific details described herein, or with other specific details, such as changes with respect to the ordering of the code flow or different code flow or steps. Thus, the scope of the techniques and/or functions described are not limited by the particular order, selection, or decomposition of steps described with reference to any particular routine.

Figure 4:
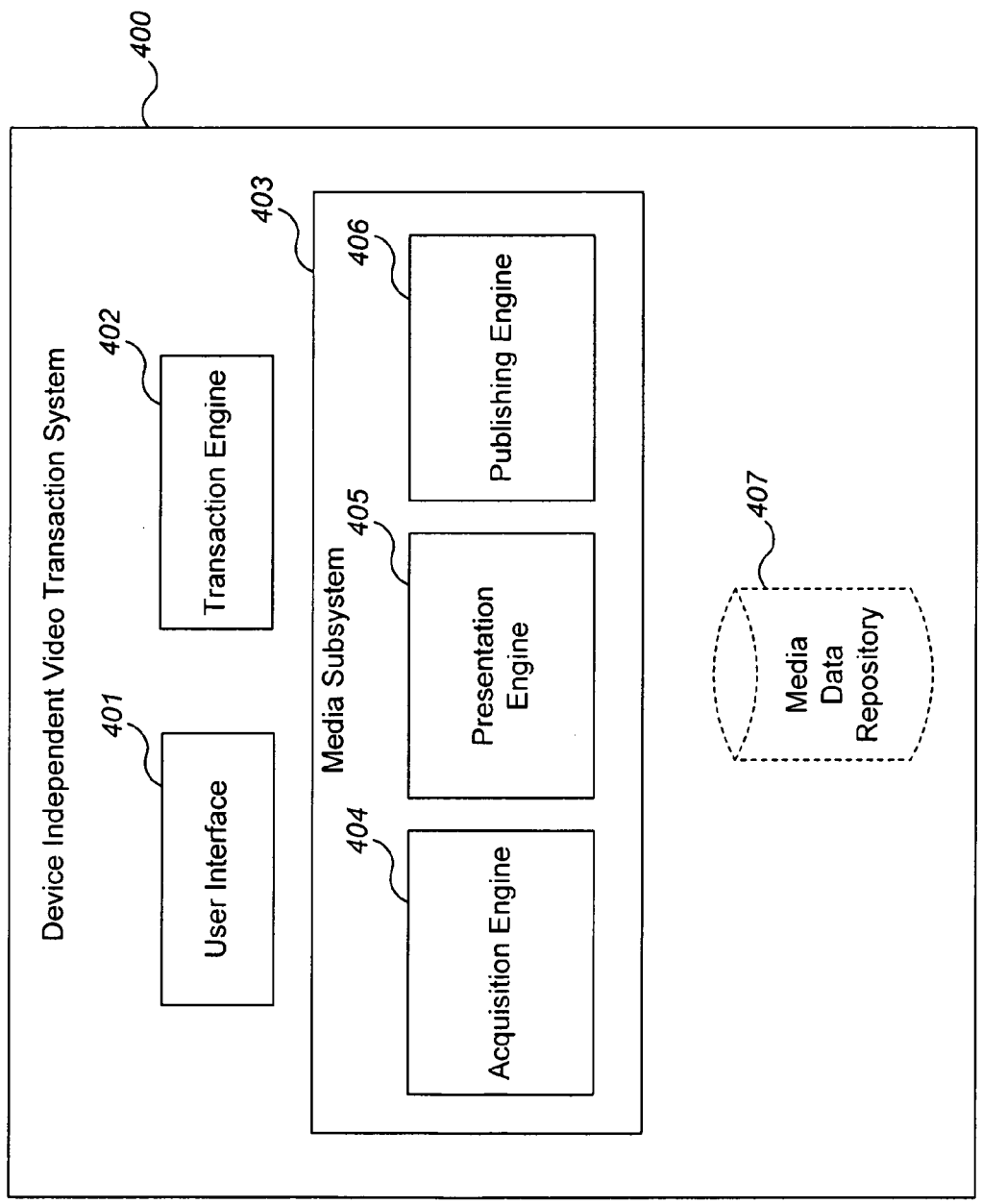
FIG. 4 is an example block diagram of components of an example embodiment of a Device Independent Video Transaction System.

FIG. 4 is an example block diagram of components of an example embodiment of a Device Independent Video Transaction System. A DIVTS 400 comprises one or more components that together enable a third-party device to acquire, transact, present, and publish media as described with reference to FIGS. 1-3. In a typical embodiment, the DIVTS 400 comprises a user interface 401, a transaction engine 402, a media subsystem 403, and optionally, a media data repository 407. In a typical embodiment, the media subsystem 403 further comprises an acquisition engine 404, a presentation engine 405, and a publishing engine 406. Note that, depending on the particular embodiment, the media subsystem 403 may comprise only some of these sub-components or different components, or have the described functionality distributed between its components in a different manner.

In the illustrated embodiment, the user interface 401 receives input from a user that indicates which function of the DIVTS 400 the user desires to perform. In addition, the user interface 401 may be responsible for converting device-dependent input events into device-independent input events, such that the other components of the DIVTS may be implemented in a device-independent manner. The transaction engine 402 initiates and conducts transactions related to the media that is to be acquired by and presented by media subsystem 403. The media subsystem 403 is responsible for acquiring media, presenting media, and sharing media through a publication mechanism. The acquisition engine 404 obtains media from various sources, including media sources and/or data repositories, such as the media data repository 407. The presentation engine 405 initiates and/or facilitates the display or presentation of media onto one or more output devices. The publishing engine 406 facilitates that sharing of media local to or remote from the DIVTS 400 with other users, devices, and/or systems. The media data repository 407 is an optional component that may exist on a DIVTS-enabled device to store and/or provide access to local media.

Figure 5:
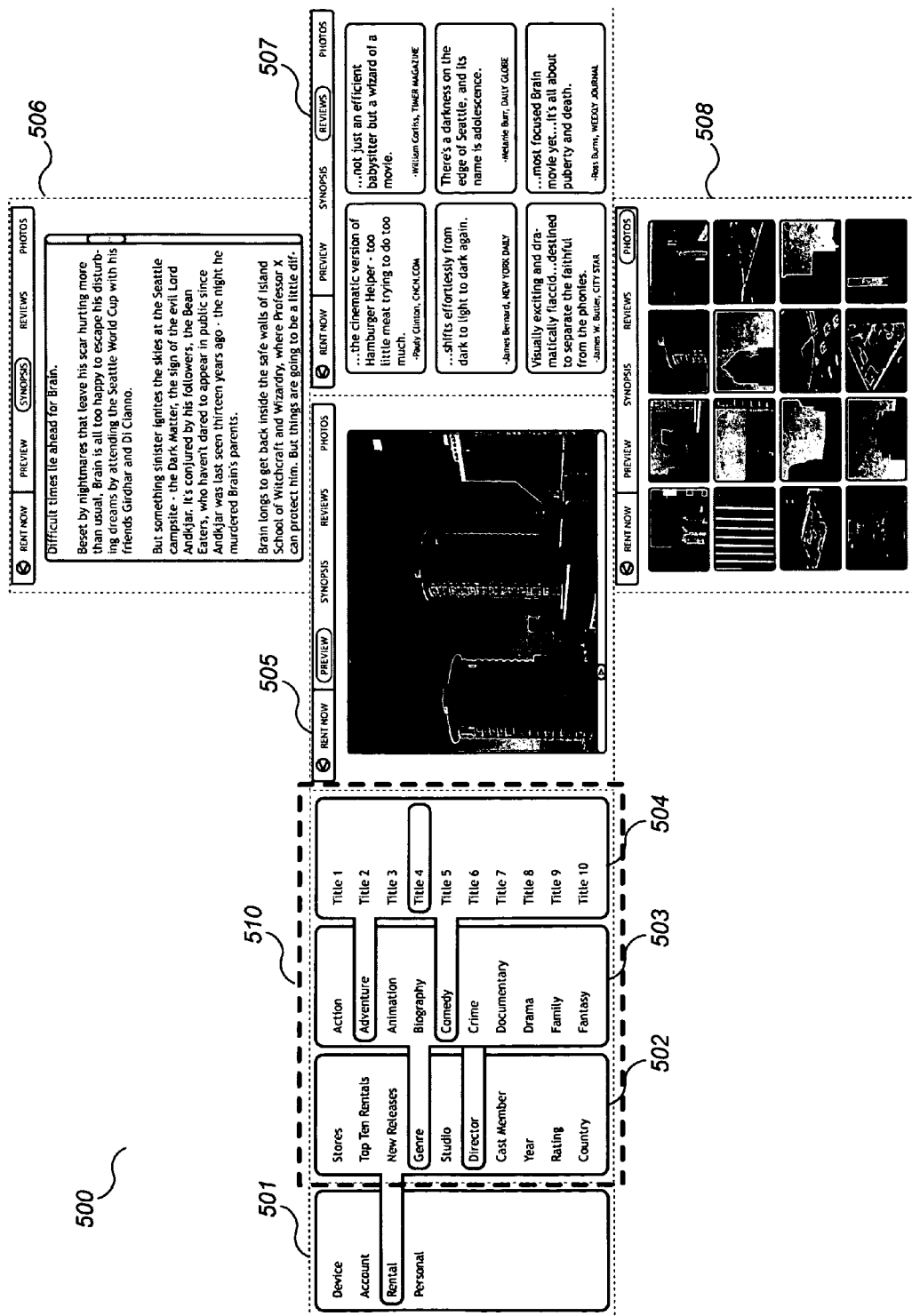
FIG. 5 is an example block diagram of a "quilt" user interface provided by an example embodiment of a Device Independent Video Transaction System.

Example embodiments of a Device Independent Video Transaction System may provide various types of user interfaces to expose media-related functionality to a user. FIG. 5 is an example block diagram of a "quilt" user interface provided by an example embodiment of a Device Independent Video Transaction System. Some embodiments of a DIVTS provide a user interface based upon a "quilt" metaphor that is configured to present a uniform mechanism for specifying media to be acquired, directing the presentation of acquired media, and initiating transactions related to the specified media. Other embodiments of a DIVTS may incorporate other user interfaces to accomplish these functions.

The illustrated quilt 500 comprises multiple "panels" that each may display information and/or provide one or more actions that may be invoked by a user. Panels in a quilt user interface are metaphorically similar to the square-shaped "blocks" of a decorative quilt, except that panels may be any shape, such as rectangles, triangles, or arbitrary polygons. The illustrated quilt 500 comprises a home panel 501, a first category panel 502, a second category panel 503, a results panel 504, a preview panel 505, a synopsis panel 506, a reviews panel 507, and a photos panel 508. Other quilts may comprise a different set of panels or may include a subset of the illustrated panels or additional panels. Each panel of the quilt is typically logically connected to at least one other panel such that a user may navigate throughout the quilt by proceeding, such as by use of animations that provide the user with the illusion of motion, from a first panel to any of the panels connected to the first panel, and from there, to other connected panels. For example, in the representation of quilt 500 the home panel 501 is connected to the first category panel 502 which is in turn connected to the second category panel 503. A user may navigate from one of these panels to another by generating an appropriate input event by using, for example, an input device such as a mouse, keypad, and/or joystick. These panels and the movement between them are described further with reference to FIGS. 7A-7E.

A user may view one or more panels of the quilt 500 by way of a viewport 510 (not actually seen by the user) that is used to frame for display at least a portion of the quilt. For example, in some embodiments, the viewport 510 may be implemented as a window that establishes a clipping region using, for example, known graphics techniques. Using clipping techniques, the viewport 510 can establish which panels are displayed to the user. In addition, the location of the viewport 510 relative to the plane of the quilt establishes a "reference" point of orientation for viewing the quilt (e.g., a camera angle). Different movement and/or animation effects can be achieved by moving the viewport 510 (i.e., the point of orientation) further from or closer to the plane of the quilt and by changing the angle of the point of orientation (i.e., an orientation angle) relative to the plane of the quilt.

For example, as the user navigates the quilt from a first panel to a second panel, the viewport may be moved in various ways to cause the second panel to be displayed. In some embodiments, the motion of the viewport 510 is performed in such a way that the user is provided with an animated transition from one panel to the next. For example, in the illustrated quilt, if the user navigates from the results panel 504 to the preview panel 505, the viewport 510 may be smoothly shifted from its illustrated position to instead enclose the preview panel 505. Additional or alternative navigation animation effects are contemplated, including immediate transitioning from one panel to another, zooming in, zooming out, and changing the tilt of the viewport relative to the plane of the quilt. Zooming in and/or out may be accomplished by lowering and/or raising the viewport. Changing the angle of the viewport relative to the plane of the quilt can provide users with the illusion of perspective. Such effects can be implemented, for example, using known 2-D and 3-D graphics techniques. Note that such animation effects may be conceptualized and accomplished in various ways that are equivalent to those described herein. For example, rather than shifting the viewport from one panel to another, the quilt (i.e., the content) may be equivalently shifted while the viewport remains in a fixed position. Other embodiments and enhancements are contemplated.

Navigation throughout the quilt may be accomplished by use of a minimal set of user interface input events. In some embodiments, a set of five events, including left, right, up, down, and select, is sufficient. The four directional events (left, right, up, and down) enable a user to navigate from one panel to the next. The select event allows a user to invoke an action available on a "currently active" panel. In some embodiments, the directional events may also cause a selection to occur (e.g., act as select events) and/or the select event may cause directional movement (e.g., act as directional events). Other embodiments may provide larger or smaller numbers of input events and may give them different names (e.g., describing "left" as "west", or "select" as "action", etc.).

Configuring the quilt to be navigable with a minimal set of input events provides a high degree of device independence that allows the quilt-based user interface to be implemented on a wide variety of hardware devices.

In addition, non-planar quilts are contemplated. For example, a quilt may be mapped onto one or more three-dimensional objects such as spheres, convex or concave polyhedrons, etc. In such embodiments, a user may be provided the illusion of "flying" or "traveling" over a three-dimensional landscape covered in quilt panels that are operative to provide information and controls for activating functionality provided by a DIVTS or other application.

Figure 6:
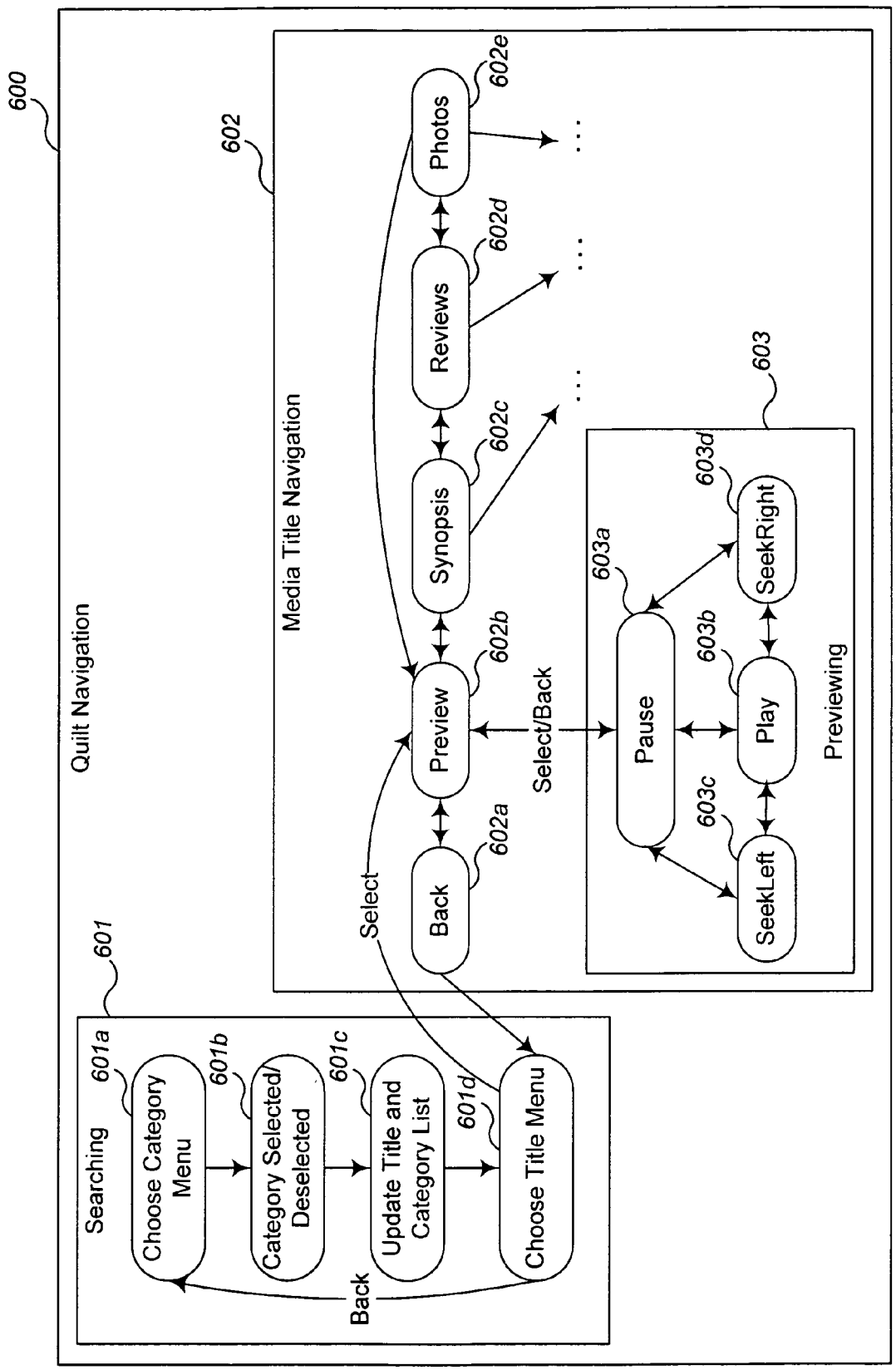
FIG. 6 is an example state diagram illustrating navigation within an example quilt user interface provided by an example embodiment of a Device Independent Video Transaction System.

In a typical planar quilt comprising rectangular panels, navigation proceeds in a horizontal or vertical fashion as described with reference to FIG. 5. FIG. 6 is an example state diagram illustrating navigation within an example quilt user interface provided by an example embodiment of a Device Independent Video Transaction System. The illustrated state diagram is a hierarchical state diagram of the navigation transitions shown in FIG. 5. That is, it consists of "super-states" that may contain one or more other states or super-states. A superstate typically includes properties that are common to all of its contained states or superstates.

The illustrated quilt navigation superstate 600 includes a searching superstate 601 and a media title navigation superstate 602. The searching superstate 601 includes a choose category menu state 601a, a category selected/deselected state 601b, an update title and category list state 601c and a choose title menu state 601d. A user may transition amongst states 601a-d by generating input events such as those described with reference to FIG. 5. As the user transitions amongst states 601a-d, various panels such as panels 502-504 will be presented to provide the user with information regarding categories of media titles that may be selected in order to search a set of media titles. By selecting one or more categories, the user may narrow the set of media titles to only those titles that are in each of the selected categories. After selecting at least one category, the user may enter the choose title menu state 601d.

From the choose title menu state 601d, the user may select one title and transition to the media title navigation superstate 602. The media title navigation superstate 602 comprises five media navigation states: a back state 602a, a preview state 602b, a synopsis state 602c, a reviews state 602d, and a photos state 602e. From each of the media navigation states 602a-e, the user may transition to another state in which the user can perform the indicated media navigation action by initiating the generation of a "select" input event (e.g., by pressing a button, moving a device, or moving a portion of a device, etc.). For example, from the preview state 602b the user may initiate the generation of the "select" input event and transition into the previewing superstate 603. In addition, the user may transition from one of the media navigation state 602a-e to another of the media navigation states 602a-e by initiating the generation of the appropriate directional (e.g., "left", "right", etc.) input event. For example, the user may transition from the preview state 602b to the synopsis state 602c by initiating the generation of the "right" input event.

The previewing superstate 603 comprises a number of states 603a-d that enable the user to preview the selected media title. The previewing superstate 603 includes a pause state 603a, a play state 603b, a seek left state 603c, and a seek right state 603d. By transitioning into an appropriate one of these states, a user may preview a selected media title by, for example, playing a portion of the media title and/or seeking (e.g., fast forward or rewind) to a particular location in the media title.

The illustrated state diagram of FIG. 6 depicts one possible set of states and transitions that may be provided to enable a user to acquire, transact regarding, and/or present media. Other state diagrams are contemplated with more or fewer states and/or transitions.

An example quilt user interface may comprise multiple panels that each provide information as well as user-selectable controls for the initiation of one or more functions provided by a DIVTS, such as those described above with reference to FIG. 6. FIGS. 7A-7E are example screen displays of various "panels" of an example quilt user interface provided by an example embodiment of a Device Independent Video Transaction System. FIGS. 7A-7E provide detailed views of several of the panels of the quilt that were introduced with reference to FIG. 5.

Figure 7A:
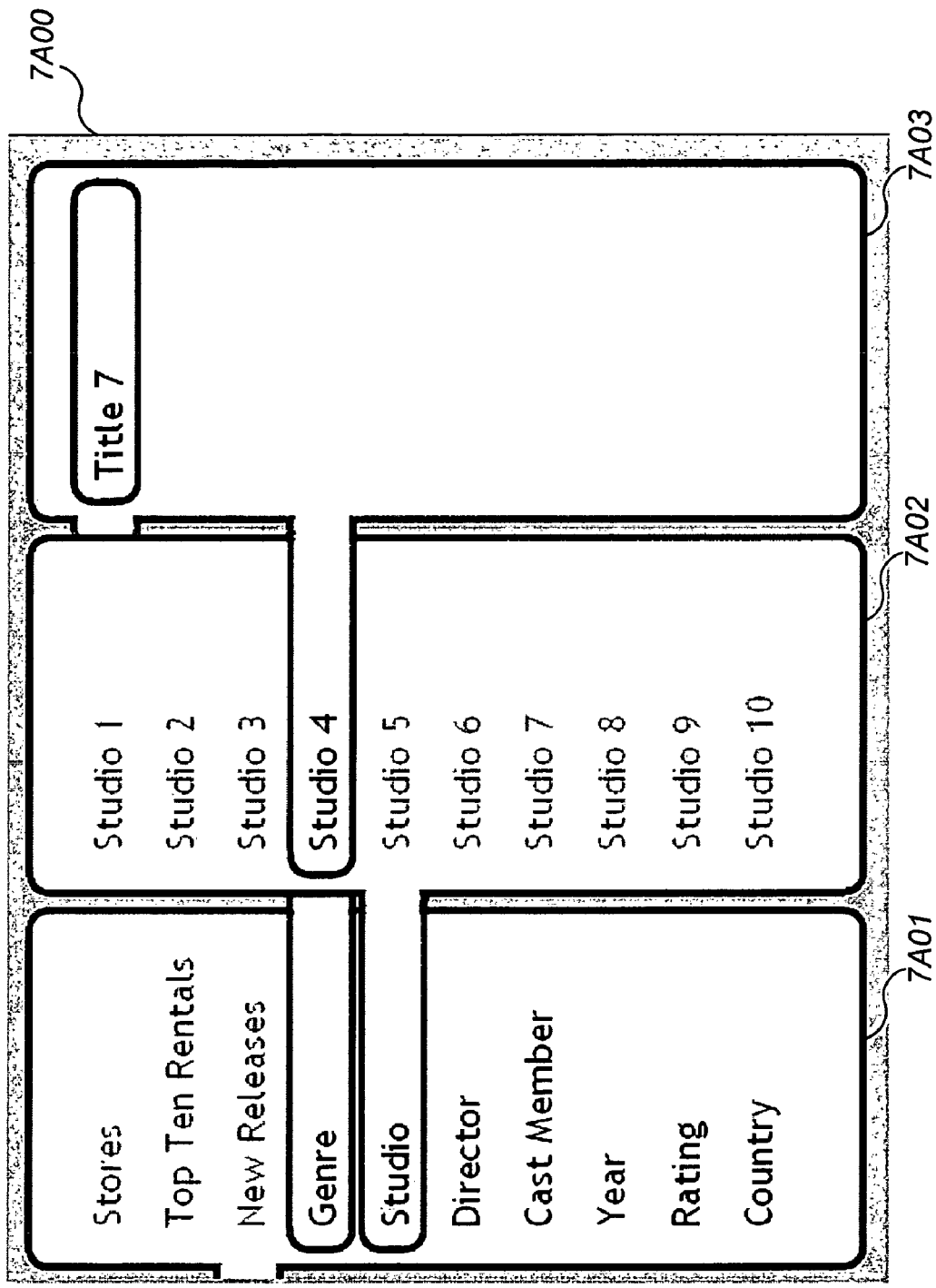
FIGS. 7A-7E are example screen displays of various "panels" of an example quilt user interface provided by an example embodiment of a Device Independent Video Transaction System.

FIG. 7A is an example screen display 7A00 of a first category panel 7A01, a second category panel 7A02, and a results panel 7A03. This screen display corresponds to a viewport 510 placed as shown in FIG. 5. In the illustrated example, a user has engaged in a search for media titles by selecting one or more categories shown in the first category panel 7A01 and in the second category panel 7A02. In response, the DIVTS user interface displays the results panel 7A03 which contains a single media title, "Title 7", that is found in each of the selected categories. Performing a media search is described further with reference to FIGS. 10 and 11A-11D.

Figure 7B:
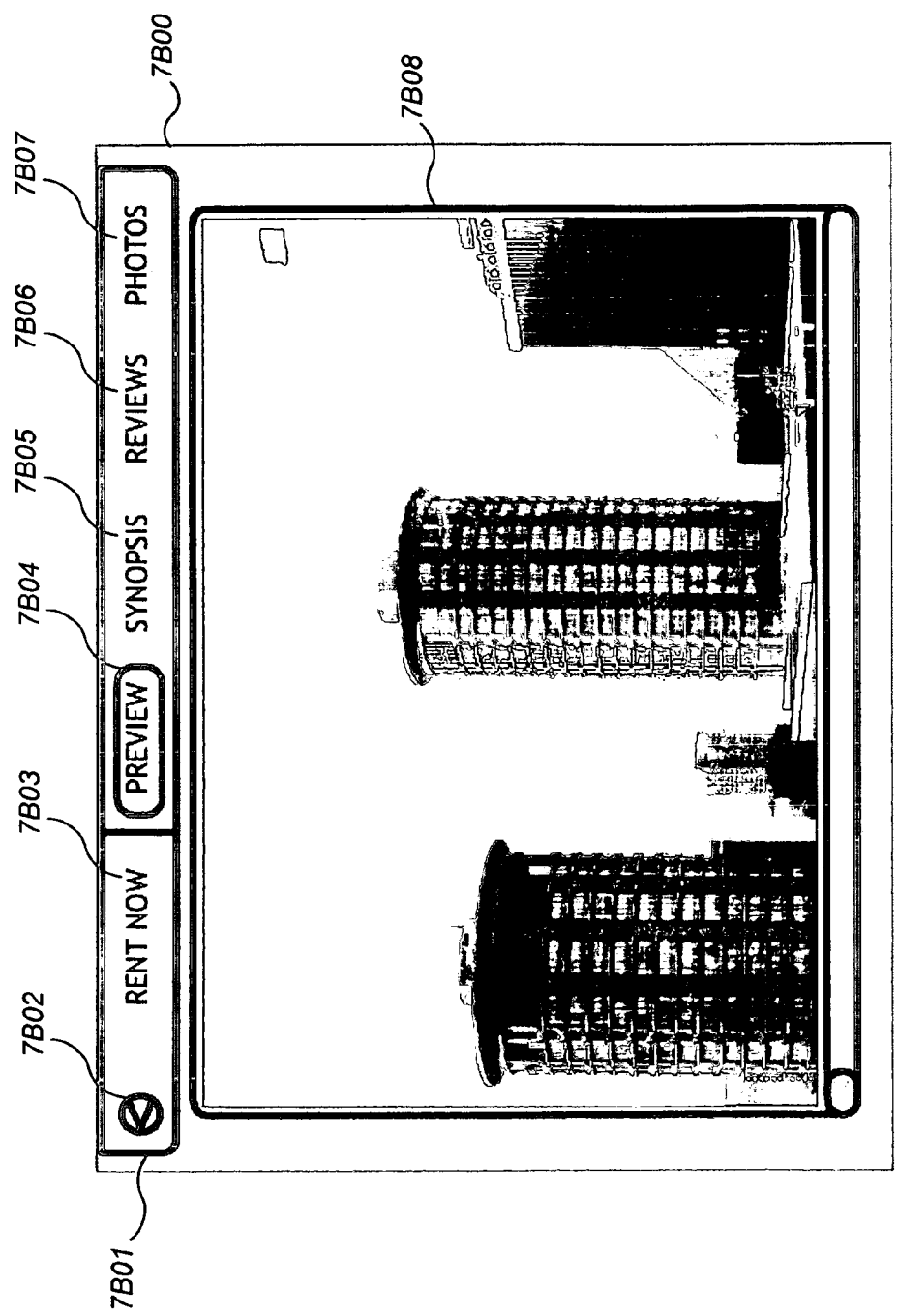

FIG. 7B is an example screen display 7B00 of a preview panel that enables the user to preview a selected media title. Display 7B00 shows a media title navigation bar 7B01 that comprises a back button 7B02, a rent now button 7B03, a preview button 7B04 a synopsis button 7B05, a reviews button 7B06, a photos button 7B07, and a video area 7B08. The user may perform the different media acquisition and transaction functions by navigating the media title navigation bar 7B01 and selecting one or more of the illustrated buttons 7B02-7B07. In the example shown, the user has selected the preview button 7B04 resulting in the display of a data video within video area 7B08 of the selected media title. After the user previews the selected media title, they may perform other or additional actions such as returning to the previous panel (e.g., the results panel 7A03 described with reference to FIG. 7A) by selecting the back button 7B02; renting the full media title by selecting the rent now button 7B03; moving to the synopsis panel described further with reference to FIG. 7C; moving to the reviews panel described further with reference to FIG. 7D; or moving to the photos panel described further with reference to FIG. 7E.

Figure 7C:
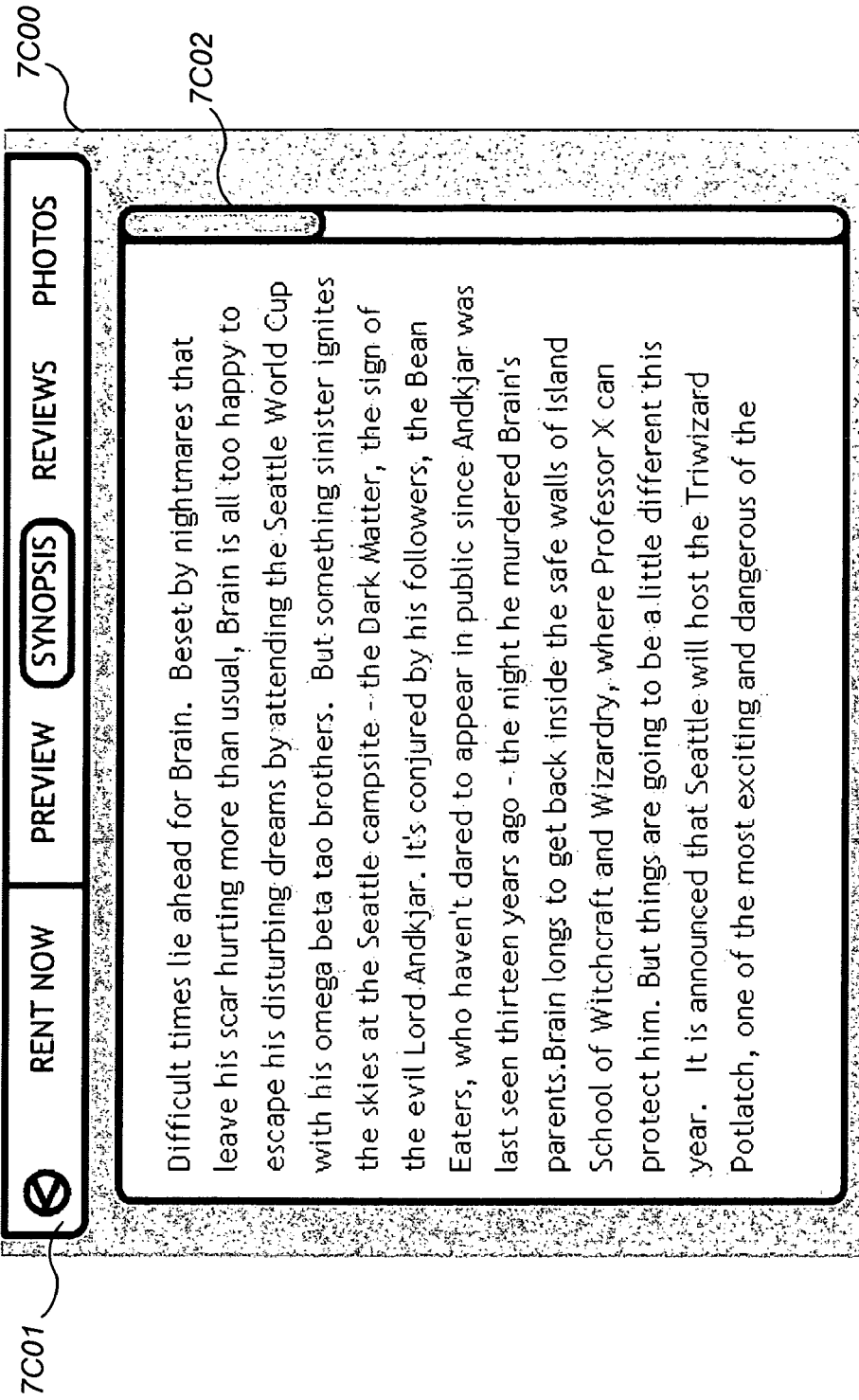

FIG. 7C is an example screen display 7C00 of a synopsis panel that enables the user to obtain a synopsis of a selected media title. The display 7C00 presents a media title navigation bar 7C01 that is similar to the media title navigation bar 7B01 described with reference to FIG. 7B. In addition, the display 7C00 includes a synopsis area 7C02 that displays a summary of the selected media title. The user may generate input events to navigate throughout (e.g., page up/down) the summary of the selected media title.

Figure 7D:
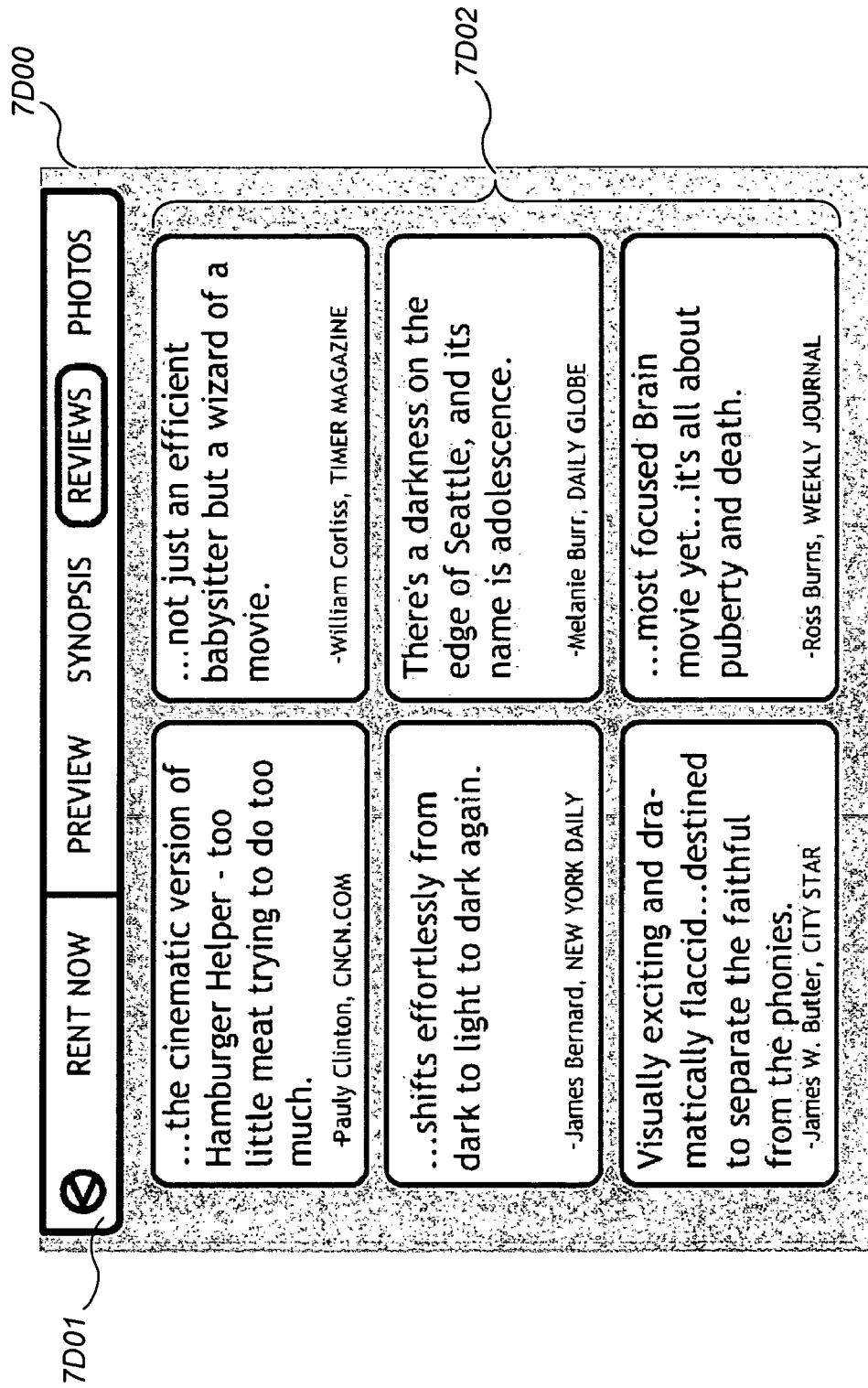

FIG. 7D is an example screen display 7D00 of a review panel that enables the user to obtain reviews of a selected media title. The display 7D00 presents a media title navigation bar 7D01 that is similar to the media title navigation bar 7B01 described with reference to FIG. 7B. In addition, the display 7D00 presents multiple reviews 7D02, which display reviews (e.g., user-authored reviews) of the selected media title. The user may generate input events to navigate throughout the reviews (e.g., page up/down if there are more reviews than fit on a single screen) and/or obtain more information about individual reviews (e.g., select a single review to obtain access to the entire review). In other embodiments, users may also utilize such an interface to create and publish their own reviews or ratings that may be shared, for examples, with other users on a MTN.

Figure 7E:
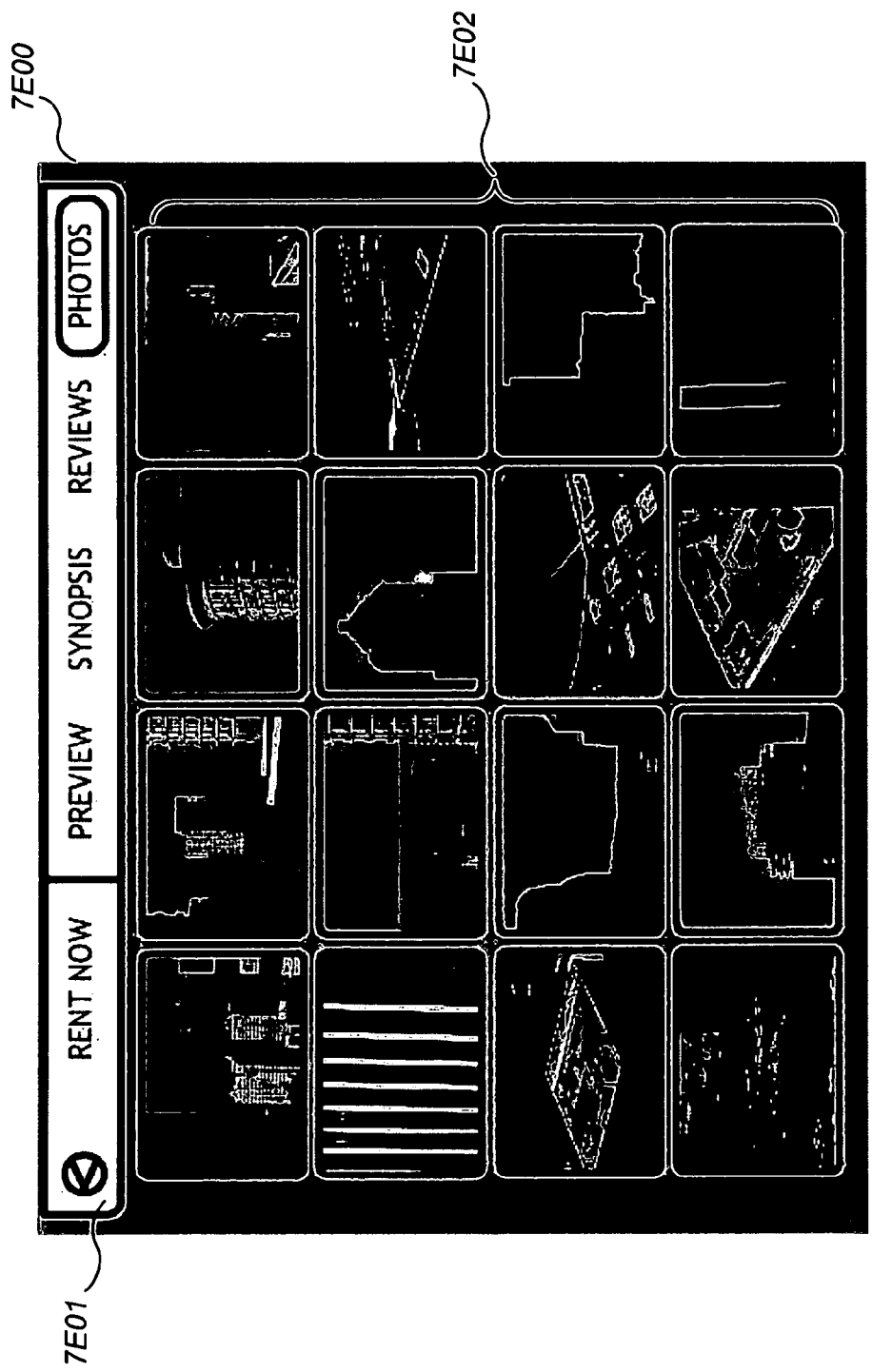

FIG. 7E is an example screen display 7E00 of a photos panel that enables the user to obtain still images taken from or occurring in a selected media title. The display 7E00 presents a media title navigation bar 7E01 that is similar to the media title navigation bar 7B01 described with reference to FIG. 7B. In addition, the display 7E00 presents multiple photos 7E02, which represent still images from the selected media title. The user may navigate amongst the various displayed photos 7E02 (e.g., if there are more than fit on a single screen) or obtain more detail about one or more displayed photos (e.g., higher resolution and/or larger images, price, textual descriptions, etc.). In some embodiments, such still images may also be purchased and/or licensed for use by the user (e.g., for a screen saver or other purpose).

Figure 8:
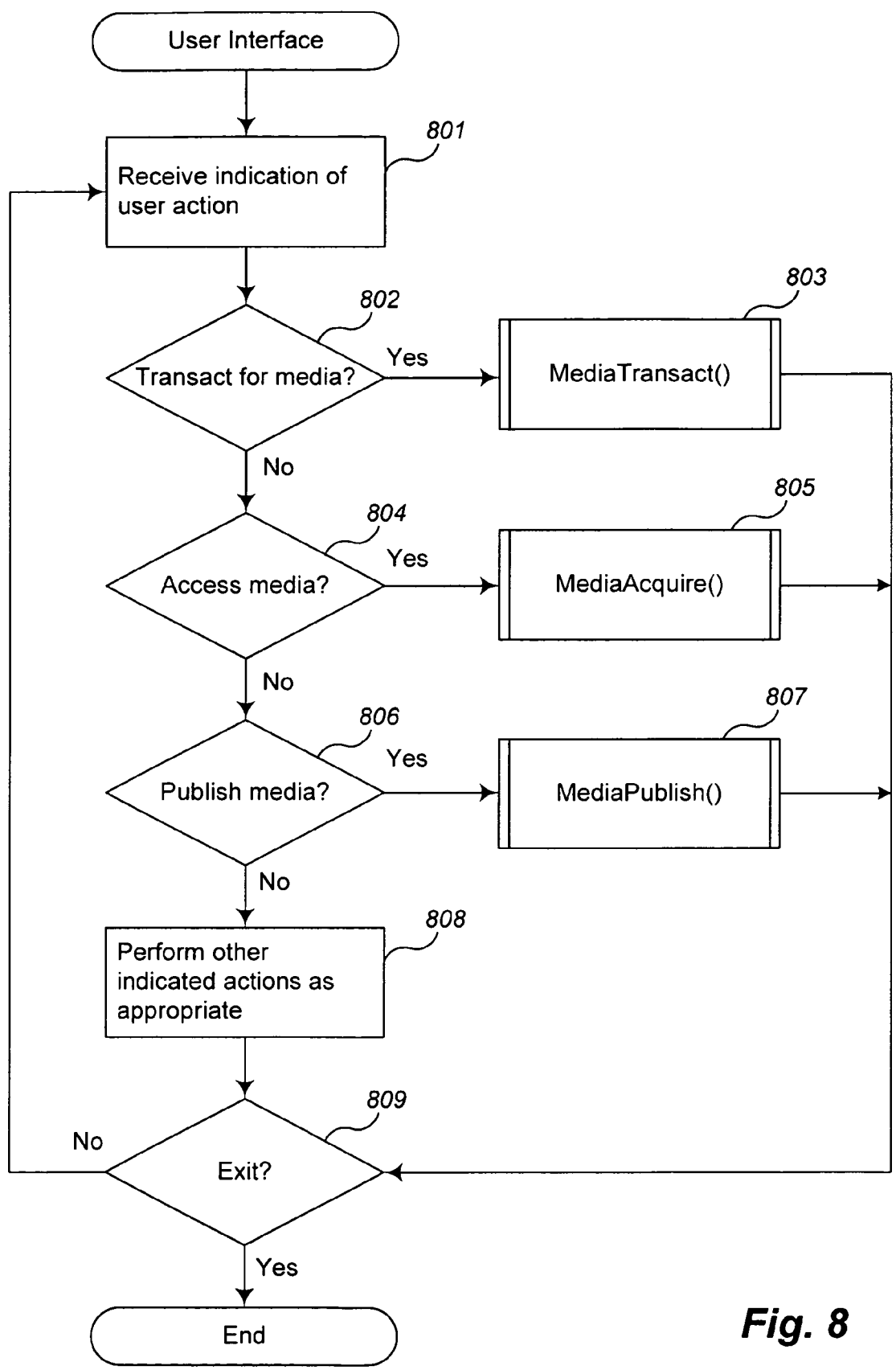
FIG. 8 is an example flow diagram of an example user interface routine provided by an example embodiment of a Device Independent Video Transaction System.

Input events initiated by users such as those described above with reference to FIGS. 5, 6, and 7A-7E may be handled in some embodiments by a user interface routine provided by a DIVTS. FIG. 8 is an example flow diagram of an example user interface routine provided by an example embodiment of a Device Independent Video Transaction System. The illustrated user interface routine may be provided by, for example, the user interface 401 of FIG. 4. In summary, the user interface routine awaits and performs user indicated actions by initiating or performing one or more functions of the DIVTS, such as acquiring or transacting media.

More specifically, in step 801, the routine determines or receives an indication of a user action to perform and then in steps 802-808 performs or initiates the indicated action. The designation of input to this routine as well as the other routines described herein may be implemented by a variety of methods known in the art, including but not limited to, parameter passing, message passing, signals, sockets, pipes, streams, and files. In step 802, the routine determines whether the indicated user action is to transact for media and/or media-related items, and, if so, continues in step 803, else continues in step 804. In step 803, the routine invokes a MediaTransact routine to transact for media. This routine is described further with reference to FIG. 9. The routine then continues in step 809.

In step 804, the routine determines whether the indicated user action is to access media, and if so, continues in step 805, else continues in step 806. In step 805, the routine invokes a MediaAcquire routine to obtain and possibly present media to the user. The MediaAcquire routine is described further with reference to FIG. 14. The routine then continues in step 809.

In 806, the routine determines whether the indicated user action is to share media content, and, if so, continues in step 807, else continues in step 808. In step 807, the routine invokes a MediaPublish routine to publish media by making it available to other users, and continues in step 809. The MediaPublish routine is described further with reference to FIG. 16.

In step 808, the routine performs any other indicated actions as appropriate, and continues in step 809. Other actions may include, for example, notifying the user of available software updates, performing such updates, adjusting system settings, etc. In step 809, the routine determines whether it is appropriate to exit or if there is any other work to be performed, and, if so, ends, otherwise returns to the beginning of the loop in step 801 to wait for and process additional received user actions.

Figure 9:
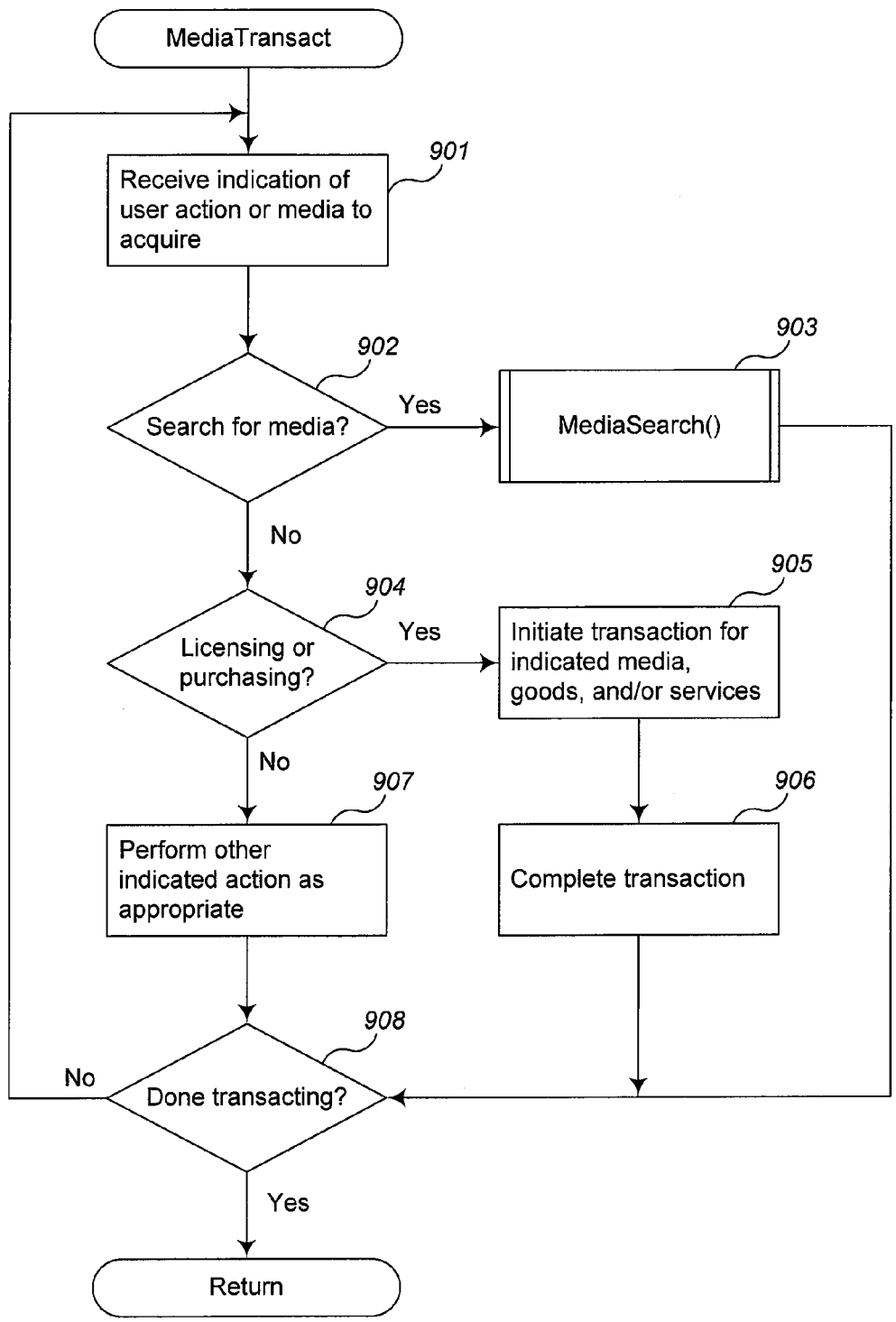
FIG. 9 is an example flow diagram of an example media transaction routine provided by an example embodiment of a Device Independent Video Transaction System.

FIG. 9 is an example flow diagram of an example media transaction routine provided by an example embodiment of a Device Independent Video Transaction System. This routine may be provided by, for example, the transaction engine 402 of FIG. 4. The MediaTransact routine performs a loop in which it repeatedly invokes user-indicated actions by initiating or performing media transaction-related functions supported by the DIVTS such as searching for and/or licensing media. In step 901, the routine determines or receives an indication of a user action or of media to be acquired. In steps 902-907, the routine processes the indicated action. Specifically, in step 902, the routine determines whether the indicated user action is a request to search for media. If so, the routine continues in step 903 and invokes the MediaSearch routine described further with reference to FIG. 10, otherwise continues in step 904. In step 904, the routine determines whether the indicated user action is to license or to purchase media and/or goods and services related to such media. If so, the routine proceeds to step 905, otherwise continues in step 906. In step 905, the routine initiates a transaction for the indicated media goods and/or services. In step 906, the routine completes the transaction. Completing the transaction may include, for example, providing the user with an indication of transaction success or failure, or interacting further with the user to obtain and/or provide additional information required to complete the transaction. In some embodiments, much or all of the information (e.g., credit card numbers, contact information, etc.) used to perform a transaction may be locally or remotely stored such that the transaction may be completed in a single step without the need for the user to provide additional information.

In step 907 the routine performs other indicated actions as appropriate. Other actions may include obtaining and providing user-generated reviews and/or ratings of media titles, adjusting or otherwise configuring user settings or preferences related to performing media transactions (e.g., favorite categories of movies, payment information, contact information, demographic information, etc.). In addition, embodiments may be supported that provide an interface and functions related to subscribing to media and/or media-related content. For example, different levels of subscribers may be supported that define what type of media the user can access, or a number of media titles per time period, etc.

After processing user actions in steps 903-907, the routine proceeds to step 908 and determines whether it is finished transacting. If it has not finished transacting (e.g., because there are additional user actions to process), the routine proceeds to step 901 and continues to process more actions. Otherwise, the routine returns.

Figure 10:
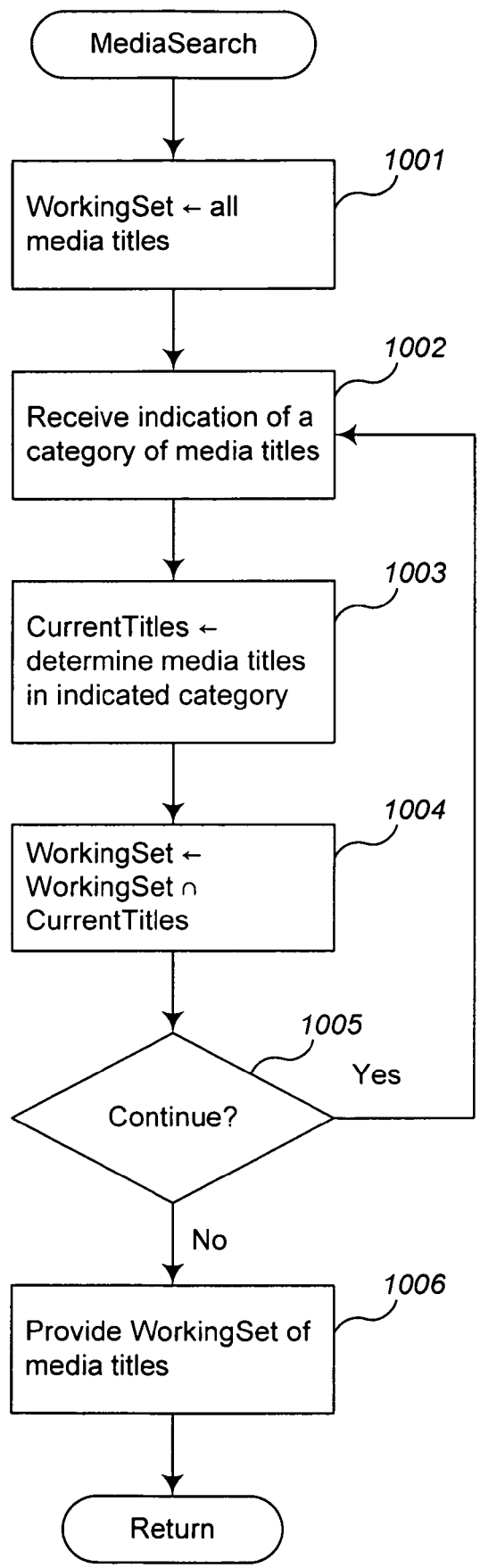
FIG. 10 is an example flow diagram of an example media search routine provided by an example embodiment of a Device Independent Video Transaction System.

FIG. 10 is an example flow diagram of an example media search routine provided by an example embodiment of a Device Independent Video Transaction System. This routine may be provided by, for example, the transaction engine 402 as described further with reference to FIG. 4. The MediaSearch routine performs a loop in which it repeatedly narrows a set of media titles according to one or more search criteria (e.g., categories) selected by a user. Although described with reference to categories and subcategories, other criteria may similarly be incorporated.

Specifically, in step 1001, the routine initializes a variable, WorkingSet, with a reference to all available media titles. This set of media titles may be stored locally, connected to the device hosting the DIVTS, or remotely, on a network-accessible media library or other information source. In step 1002, the routine receives an indication of a category of media titles. In the illustrated embodiment, a category of media titles is a set of media titles that all have a common property, such as being written by a particular author, being directed by a particular director, being related to a particular genre (e.g., action, adventure, romance, etc.), having a particular country of origin or language, etc. Categories are described further with reference to FIG. 12.

In step 1003, the routine determines which of the media titles corresponds to the indicated category and initializes another variable, CurrentTitles, with a reference to the media titles belonging to the category indicated in step 1002. In step 1004, the routine sets the WorkingSet variable to refer to the collection of titles that appear in both the current WorkingSet as well as the set of CurrentTitles. (This variable is updated to refer to the current titles indicated by the current search criteria in effect at each loop iteration.) In step 1005, the routine determines whether to continue to process additional search criteria, and if so, continues in step 1002, otherwise continues in step 1006. The routine may continue if, for example, it has received an additional indication of a category of media titles. In step 1006, the routine provides the set of titles indicated by the WorkingSet variable which reflects the set of media titles that match all of the indicated categories of media titles. The routine then returns.

Note that in one embodiment, the search criteria are combined to form an intersection of the set of titles in each indicated category. The WorkingSet variable then reflects the set of media titles that are members of the set intersection of this set. In other embodiments, other logical or set operators may be utilized to perform other types of searches, and the WorkingSet variable will be accordingly adjusted. For example, in some embodiments users may select one or more set combination operators in order to perform other kinds of searches (e.g., all action movies from China or Europe).

Some embodiments may provide one or more user interface screens in order to obtain input from a user for and provide results from a search process such as the one described above with reference to FIG. 10. FIGS. 11A-11D are example screen displays of search panels of an example quilt user interface provided by an example embodiment of a Device Independent Video Transaction System. FIGS. 11A-11D illustrate an example of four consecutive screens that may be provided to a user during the course of a search for media titles, such as that provided by FIG. 10.

Figure 11A:
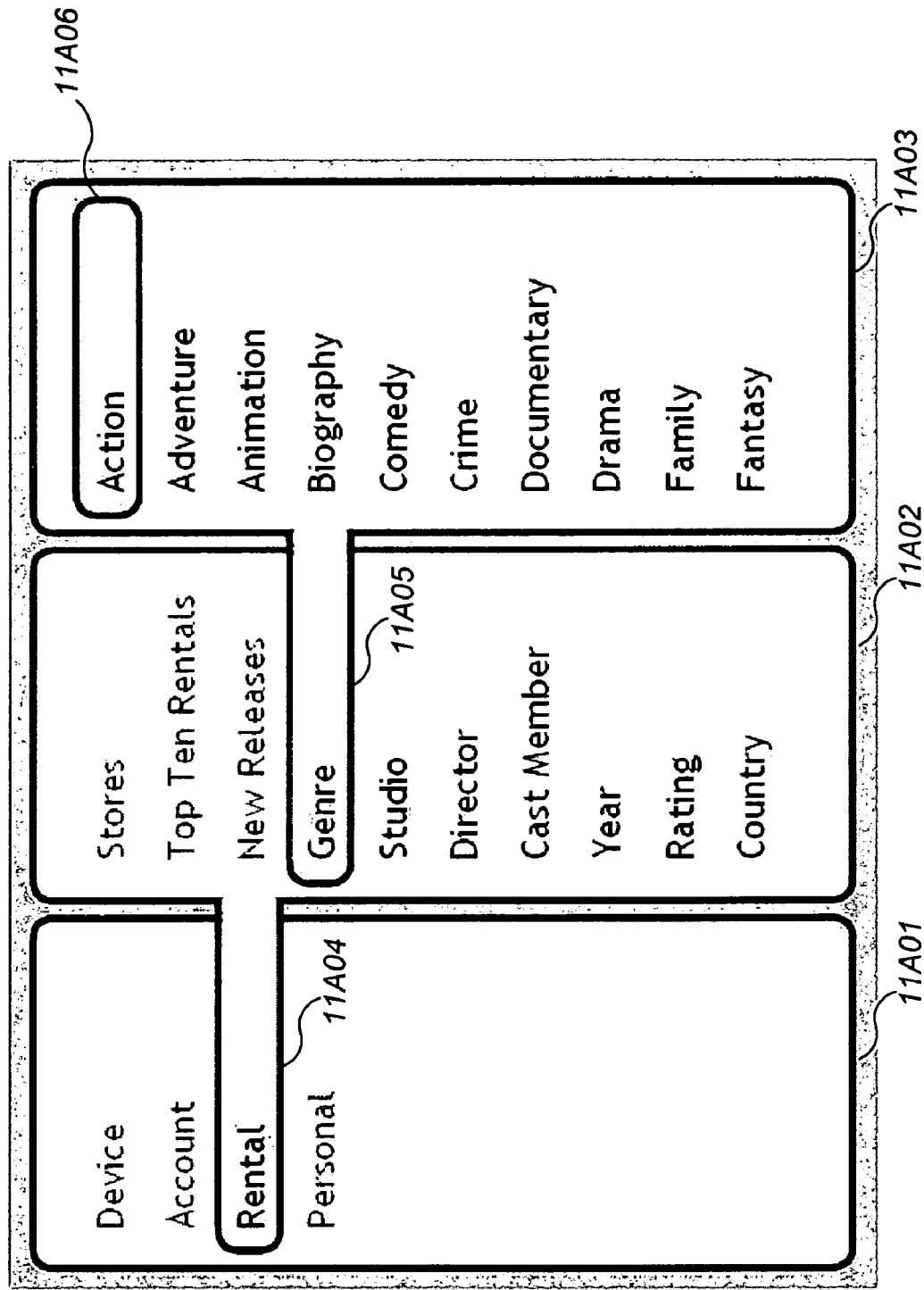
FIGS. 11A-11D are example screen displays of search panels of an example quilt user interface provided by an example embodiment of a Device Independent Video Transaction System.

FIG. 11A depicts the state of a search in which the user is selecting from one of a number of genre categories. The screen displays three panels: a home panel 11A01, a supercategory panel 11A02, and a category panel 11A03. The user has selected a rental option 11A04 from the home panel 11A01, indicating that the user desires to rent a media title for viewing. From the supercategory panel 11A02, the user has selected the genre option 11A05, indicating that the user desires to specify a particular "Genre" category for the search. From the category panel 11A03, the cursor 11A06 is currently on the "Action" category. At this point, if the user initiates the generation of the "select" input event, the user interface will animate a transition to present on the display a view of a new panel of the quilt.

Figure 11B:
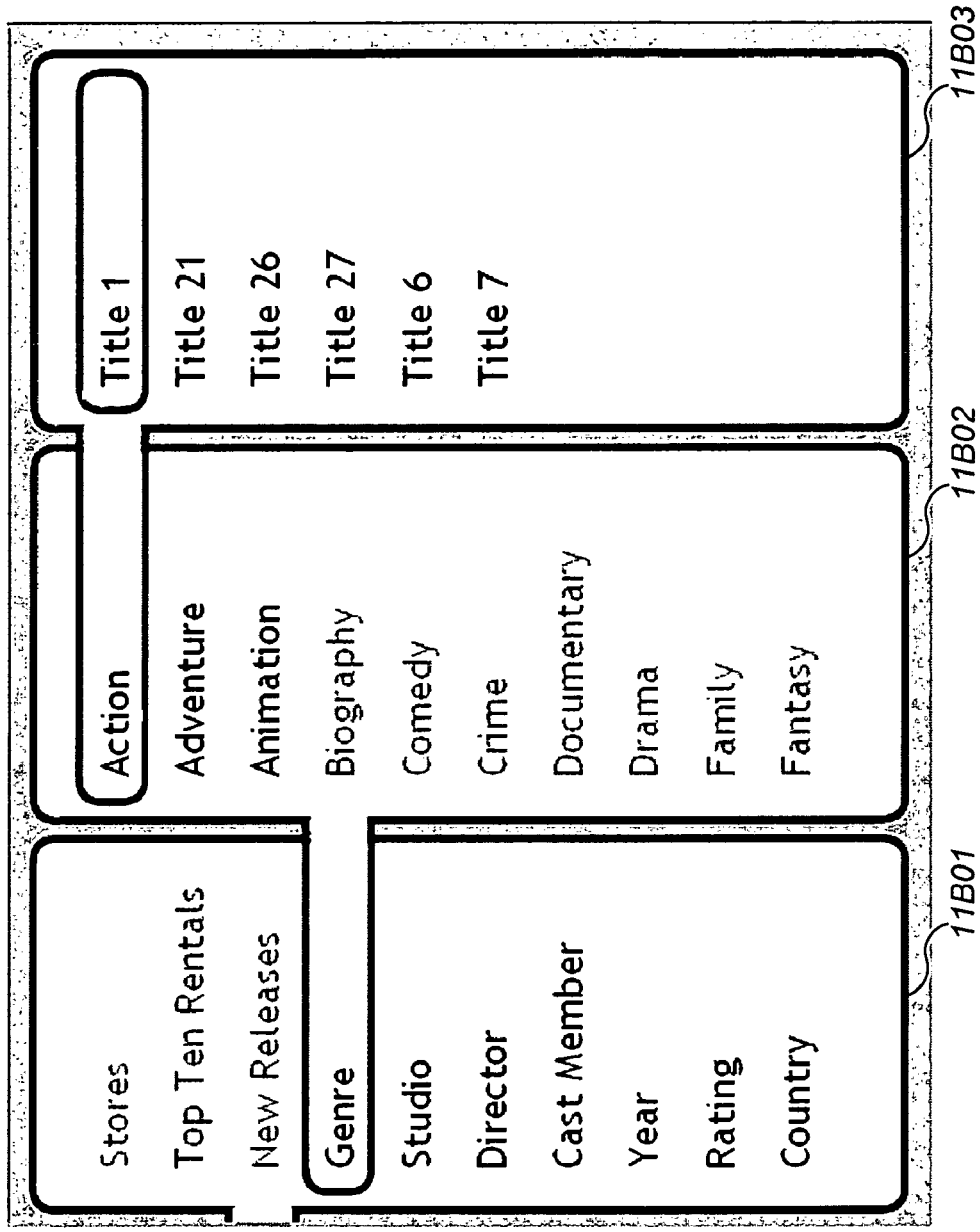

FIG. 11B depicts a resulting screen display after the user selects the "Action" category shown in FIG. 11A. This screen display shows a supercategory panel 11B01, which is the supercategory panel 11A02 depicted in FIG. 11A, a category panel 11B02, which is the category panel 11A03 depicted FIG. 11A, as well as a results panel 11B03. Note that the home panel 11A01 of FIG. 11A is no longer displayed because the illustrated quilt user interface is configured in this example to only show at most three search panels (the viewport has been accordingly moved). In other embodiments, it may be configured to show more or fewer panels. In some embodiments, such configuration may be performed automatically, in response to an indication of particular hardware requirements (e.g., a small display device on a PDA). The results panel 11B03 currently depicts a total of six titles that are members of the "Action" category.

Figure 11C:
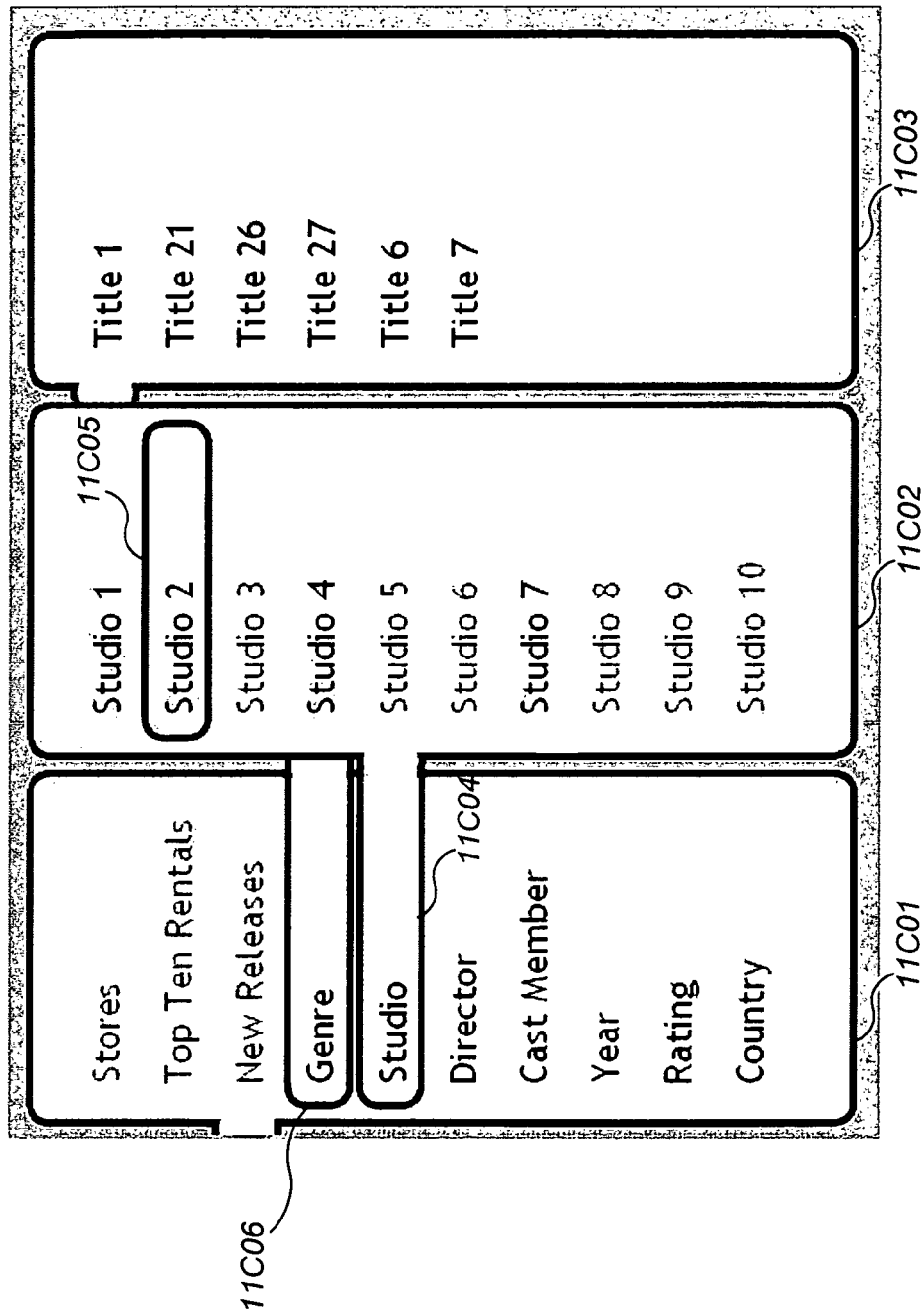

FIG. 11C depicts a screen display that is provided when the user next decides to further filter the search results of FIG. 11B by selecting an additional category. In this example, the user has moved back, by initiating the generation of the appropriate input events to select an additional supercategory ("Studio") 11C04 from the illustrated supercategory panel 11C01. Recall that according to the illustrated embodiment search criteria are combined by use of a logical "AND" (intersection) operation. As a result, a new category panel 11C02 is displayed that shows a number of studios in the selected supercategory. Note that some of the studios (Studio 3, Studios 5-6, and Studios 8-10) are grayed out. Grayed out categories indicate to the user that there are no media titles that fall within in the grayed out category as well as the other selected categories (in this case, the "Action" category of the genre supercategory). In other embodiments, other mechanisms may be used to indicate an absence of media titles within particular categories that may be selected in conjunction with one or more already-selected categories. Such mechanisms include, for example, displaying such categories in different colors, annotating such categories with an icon and/or symbol, and hiding such categories from display. In addition, a result panel 11C03 from the initial search undertaken and displayed in FIG. 11B is still displayed. This panel will be updated to reflect the results of the additional search criteria when the user selects one of the available categories in the category panel 11C02.

Figure 11D:
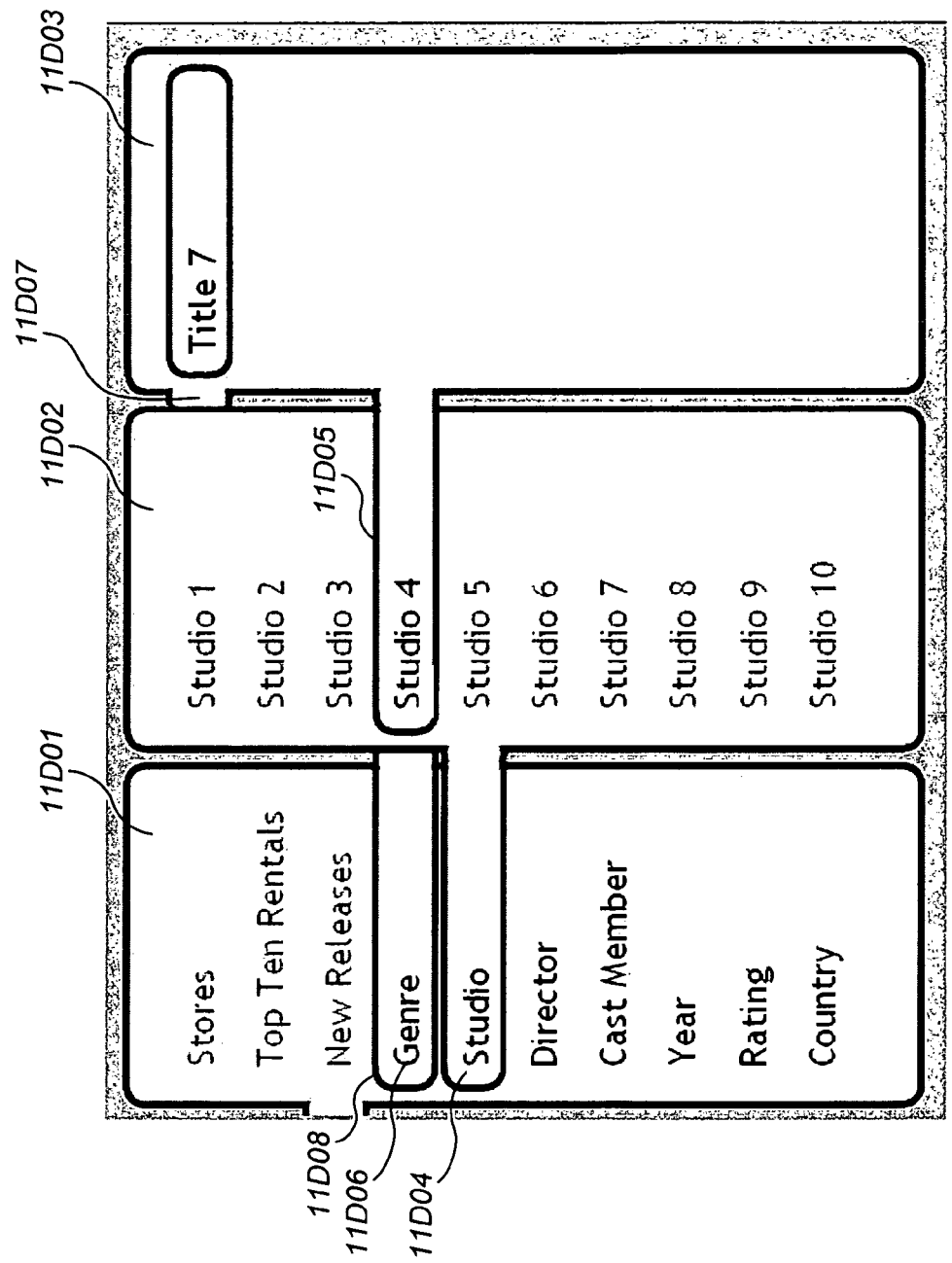

FIG. 11D depicts a screen display that is provided when the user selects one of the studio categories in FIG. 11C. In this case, the user selects the category "Studio 4" 11D05, which results in the update of the results panel 11D03 to reflect that there is only a single media title, "Title 7," that is in both the "Action" category of the "Genre" supercategory 11D06 as well as the "Studio 4" category of the "Studio" supercategory 11D05. Note that the supercategory panel 11D01 indicates that the "Genre" supercategory 11D06 is still selected by circumscribing the appropriate text with a tab 11D08. In addition, a bridge 11D07 emerging from under the category panel 11D02 and connecting with the results panel 11D03 indicates that the search results derive from two selected categories. In this manner, the user is apprised of the structure and categories of their current search.

Figure 12:
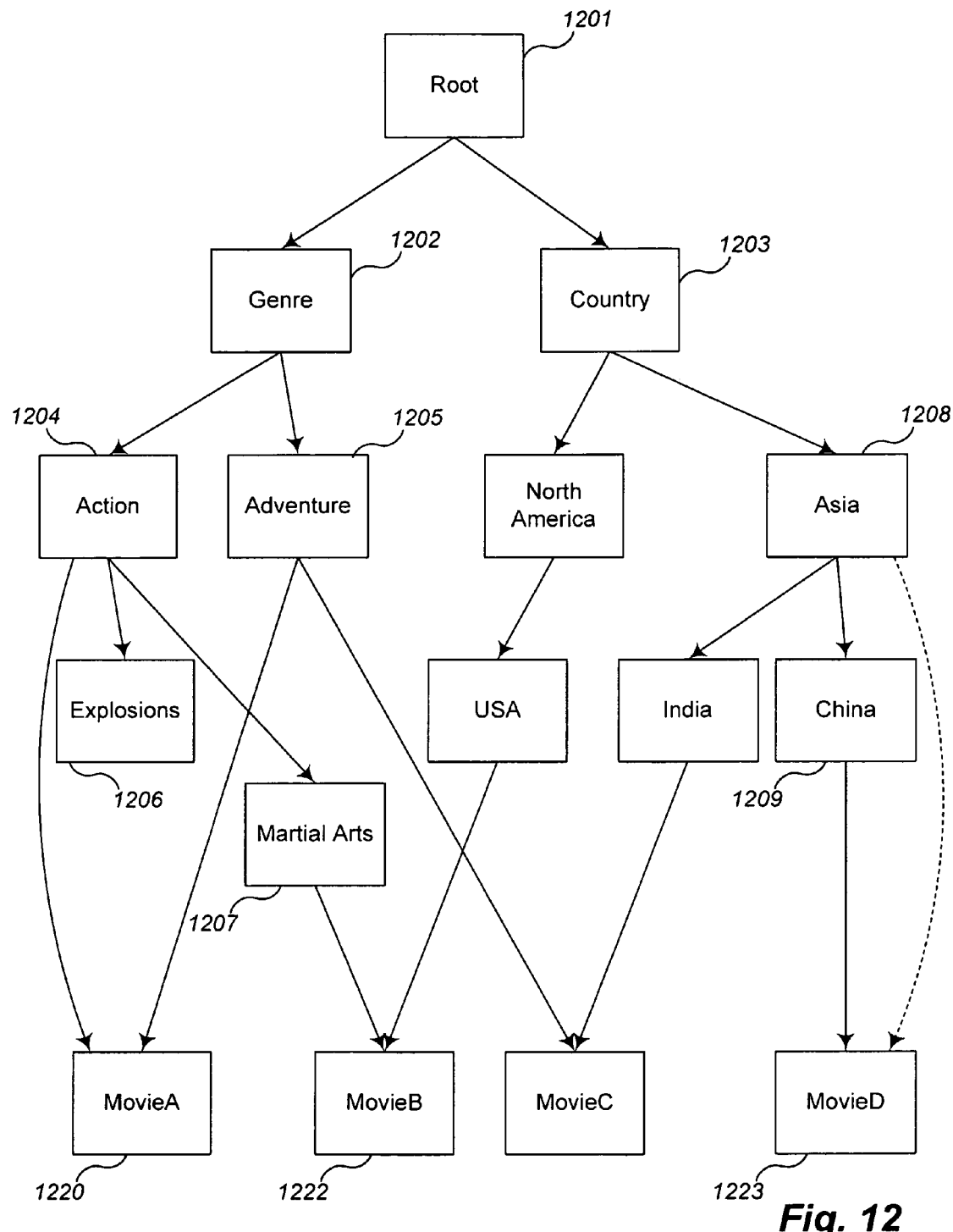
FIG. 12 is a categorization graph representing an example categorization of a number of example media titles.

The category-based approach to searching for media titles utilized by some embodiments and described above with reference to FIGS. 11A-11D may be conceptualized in terms of a categorization graph. FIG. 12 is a categorization graph representing a categorization of a number of example media titles. A categorization graph is a directed acyclic graph that may be used to represent one or more categories for one or more media titles. Arcs are directed (e.g., by use of an arrow) lines (straight, curved, or otherwise) used to indicate relationships between nodes in a graph. Parent nodes (nodes with arcs emanating from them) are category nodes. Leaf nodes (nodes with no arcs emanating from them) are either media title nodes or empty category nodes. A category node may be empty or indicate (by way of one or more arcs) one or more categories and/or media titles it contains. A supercategory node is a category node that indicates at least one category node that the supercategory node contains. Note that the two-level hierarchy comprising supercategories and categories utilized in the examples described with reference to FIGS. 11A-11D may be generalized by use of a categorization graph. For example, the illustrated categorization graph has a single root node 1201 that contains all other categories, either directly or indirectly. In other embodiments, multiple root nodes may be represented.

In the illustrated graph, the root node 1201 includes a genre category node 1202 and a country category node 1203. The genre category node 1202 and the country category node 1203 include additional category nodes as illustrated. For example, the genre category node 1202 includes an action node 1204 and an adventure node 1205. The action category node 1204 includes a media title node 1220, an explosions category node 1206, and a martial arts category node 1207. Note that the explosions category node 1206 is currently empty, in that it does not refer to any other categories or media titles. Note also that the media title node 1220 is referred to by multiple category nodes. In general, there are no limits or restrictions on the number of categories that may include a given media title. In addition, even though media titles in the example illustrated in FIGS. 11A-11D are organized into a two-level hierarchy consisting of supercategories and categories, there are no limits to how many levels of categories and subcategories that may be represented in a categorization graph and represented in the search user interface.

In addition, the country category node 1203 has an Asia category node 1208 that refers to a China category node 1209, which in turn refers to a media title node 1223. The graph shows an additional dashed arc 1211 that indicates that in some embodiments, category nodes may include direct arcs that bypass subcategories and refer directly to media titles contained by such subcategories. Such direct arcs may be used as an optimization for performing searches because direct arcs provide for efficient lookup of all media titles in a given category, even if the category is at or near the root of the categorization graph.

The structure of a categorization graph may be in some embodiments derived automatically from structured or unstructured metadata related to a set of media titles. For example, keywords, tags, dates, and/or other structured (e.g., XML ("eXtensible Markup Language")) and unstructured (e.g., movie reviews) information may be inspected and utilized in order to generate a categorization graph. For example, various known techniques including automatic text classification may be employed to process unstructured data such as reviews, press releases, advertisements, in addition to text portrayed in the media itself (e.g., as the textual version of an audio book or a film script) for purposes of automatically generating a categorization graph or equivalent data structure that may be used to represent interrelationships between media titles and categories.

In addition, using a categorization graph or equivalent data structure, the structural interrelationships and panel contents of the search portion of a quilt user interface may also be automatically generated. For example, the children of any given category node may be allocated, or placed within, a single category panel. Selecting a category represented by a particular category node then results in the display of a category panel that contains the children of that category node and/or the display of a results panel that contains the media titles referenced by that category node.

Figure 13A:
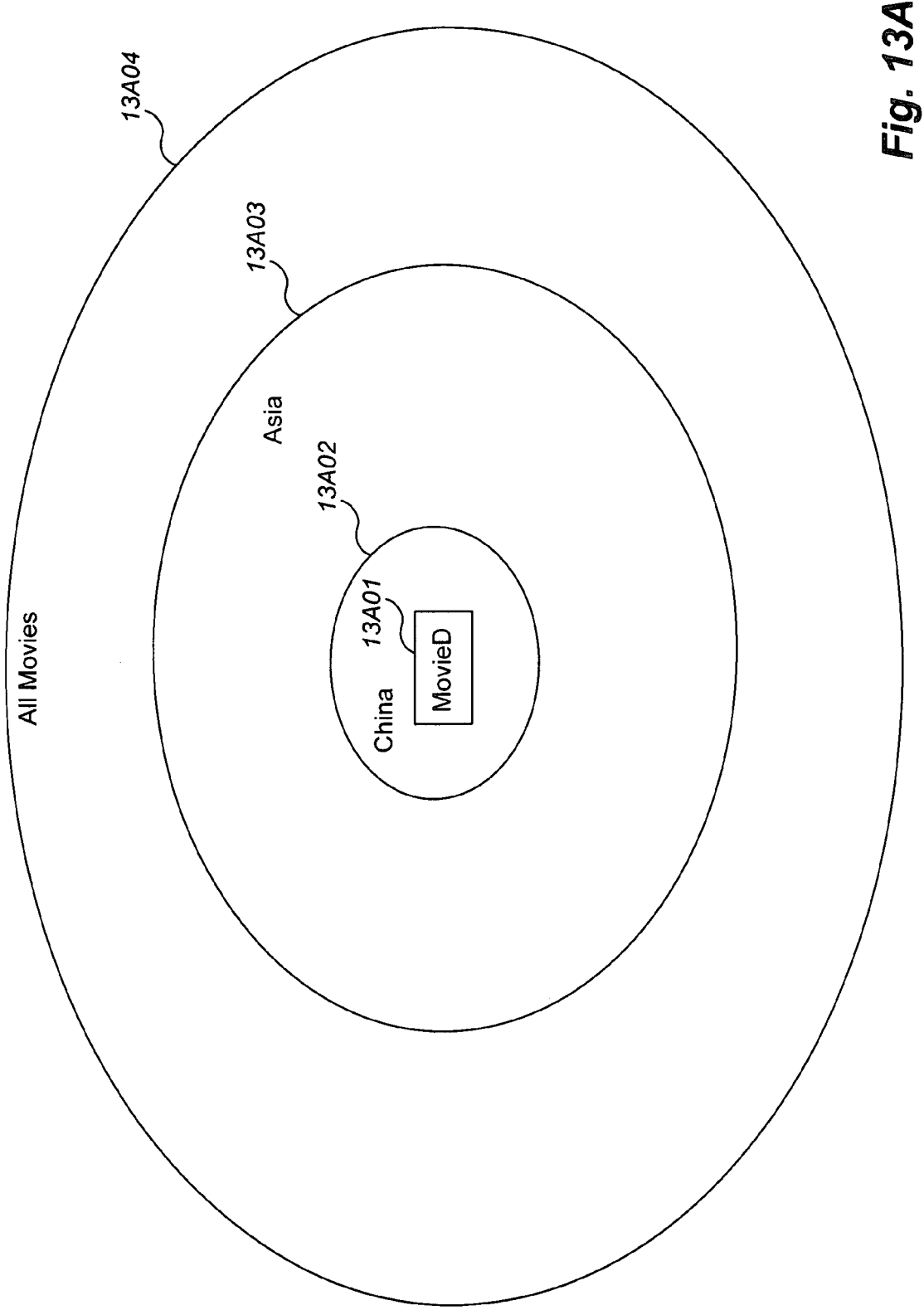
FIGS. 13A-13B are Venn diagrams representing an example categorization of a number of example media titles.
Figure 13B:
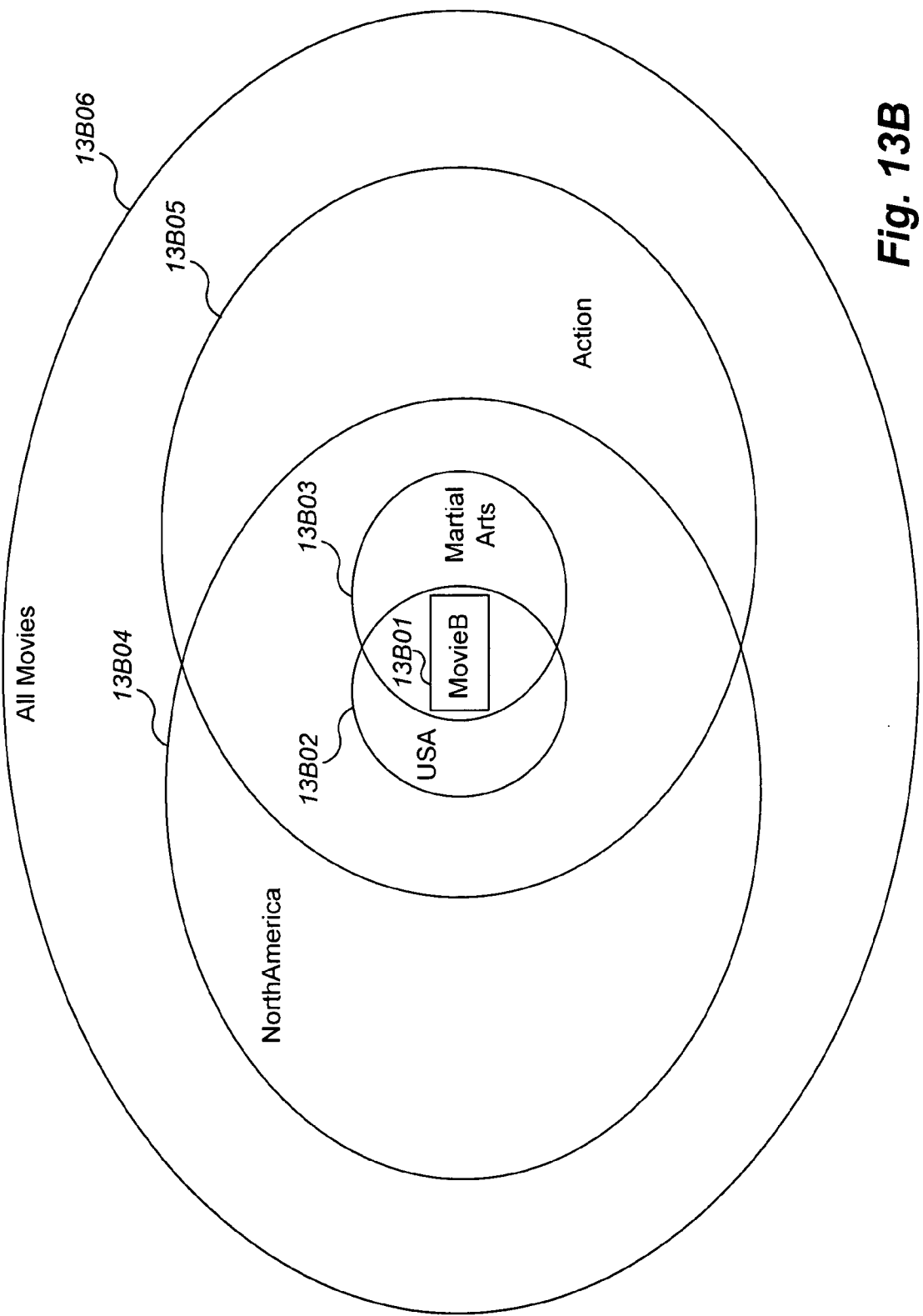

The process of filtering search criteria for the purpose of organizing into panels to use with the quilt user interface can also be represented using Venn diagrams. FIGS. 13A-13B are Venn diagrams that represent a categorization of a number of example media titles. These figures provide an alternative representation showing some of the set relationships between the various categories shown in FIG. 12. FIG. 13A, for example, shows that MovieD 13A01 (shown in node 1223 in FIG. 12) is a member of the China category 13A02, which in turn is a subset of the Asia category 13A03, which in turn is a subset of the universal category of all movies 13A04. As another example, FIG. 13B shows that MovieB 13B01 (shown in node 1222 in FIG. 12) is a member of both the USA category 13B02 and the Martial Arts category 13B03. The USA category 13B02 is in turn a subset of the North America category 13B04. The Martial Arts category 13B03 is both a subset of the Action category 13B05 and the North America category 13B04. Both the North America category 13B04 and the Action category 13B05 are subsets of the universal category 13B06. In some embodiments, it is contemplated that drawing Venn diagrams to display relationships exhibited by the user interface may be useful.

Figure 14:
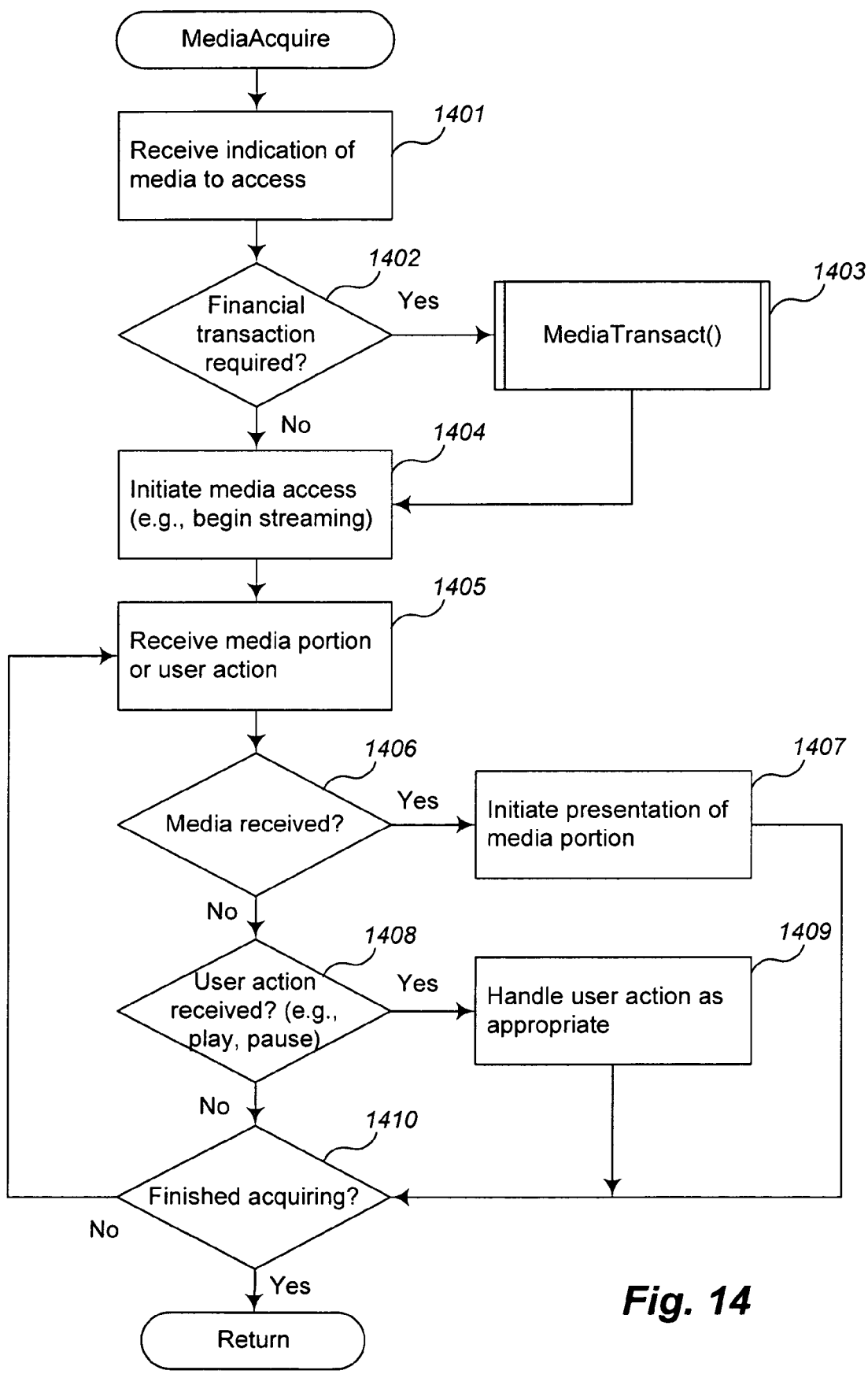
FIG. 14 is an example flow diagram of an example media acquisition routine provided by an example embodiment of a Device Independent Video Transaction System.

Referring back to FIG. 2, step 202, in a typical embodiment of the DIVTS user interface, in addition to searching for media, a user can also acquire media from various sources. FIG. 14 is an example flow diagram of an example media acquisition routine provided by an example embodiment of a Device-Independent Video Transaction System. The routine may be provided by, for example, the media acquisition engine 404 of FIG. 4. The MediaAcquire routine optionally initiates transactions to acquire a media title (e.g., licensing) and also performs a loop in which it receives media from a media source and initiates its presentation as appropriate. An example user interface for acquiring media is described with reference to FIG. 15. Specifically, in step 1401, the routine determines an indication of media to access. Such indications may be, for example, received as a result of a selection by the user. In step 1402, the routine determines whether a financial transaction is required in order to acquire the indicated media. If so, the routine proceeds to step 1403, otherwise continues in step 1404. In step 1403, it invokes the MediaTransact routine described with reference to FIG. 9. If instead it is determined in step 1402 that a financial transaction is not required, or after step 1403, then in step 1404 the routine initiates media access. Initiating media access may include sending messages over a network, calling functions or procedures, or other mechanisms by which a media source can be notified to start providing media. In step 1405, the routine receives a portion of the indicated media or a user action. In step 1406, the routine determines whether media was received, and if so, the routine proceeds with step 1407, else continues in step 1408. In step 1407, the routine initiates the display of the received media portion. In some embodiments, this will include presenting frames of video onto a display device and/or playing frames of audio data onto a speaker or other audio output device. After step 1407, the routine continues in step 1410.

If instead the routine determines in step 1406 that media was not received, then in step 1408 the routine determines whether a user action was received, and if so continues in step 1409, else continues in step 1410. Example user actions include playing, pausing, fast forwarding, or stopping the display of video and/or other media. In step 1409, the routine handles the received user action as appropriate, and then continues in step 1410. For example, if an indication of a pause action is received, the routine pauses the display of video and/or audio.

In step 1410, the routine determines whether it has finished acquiring the indicated media and, if not, the routine returns to step 1405 to process more media. The routine may be finished if, for example, no more media portions are available or the user has indicated that they wish to quit or otherwise terminate the acquisition process. If finished, the routine returns.

Figure 15:
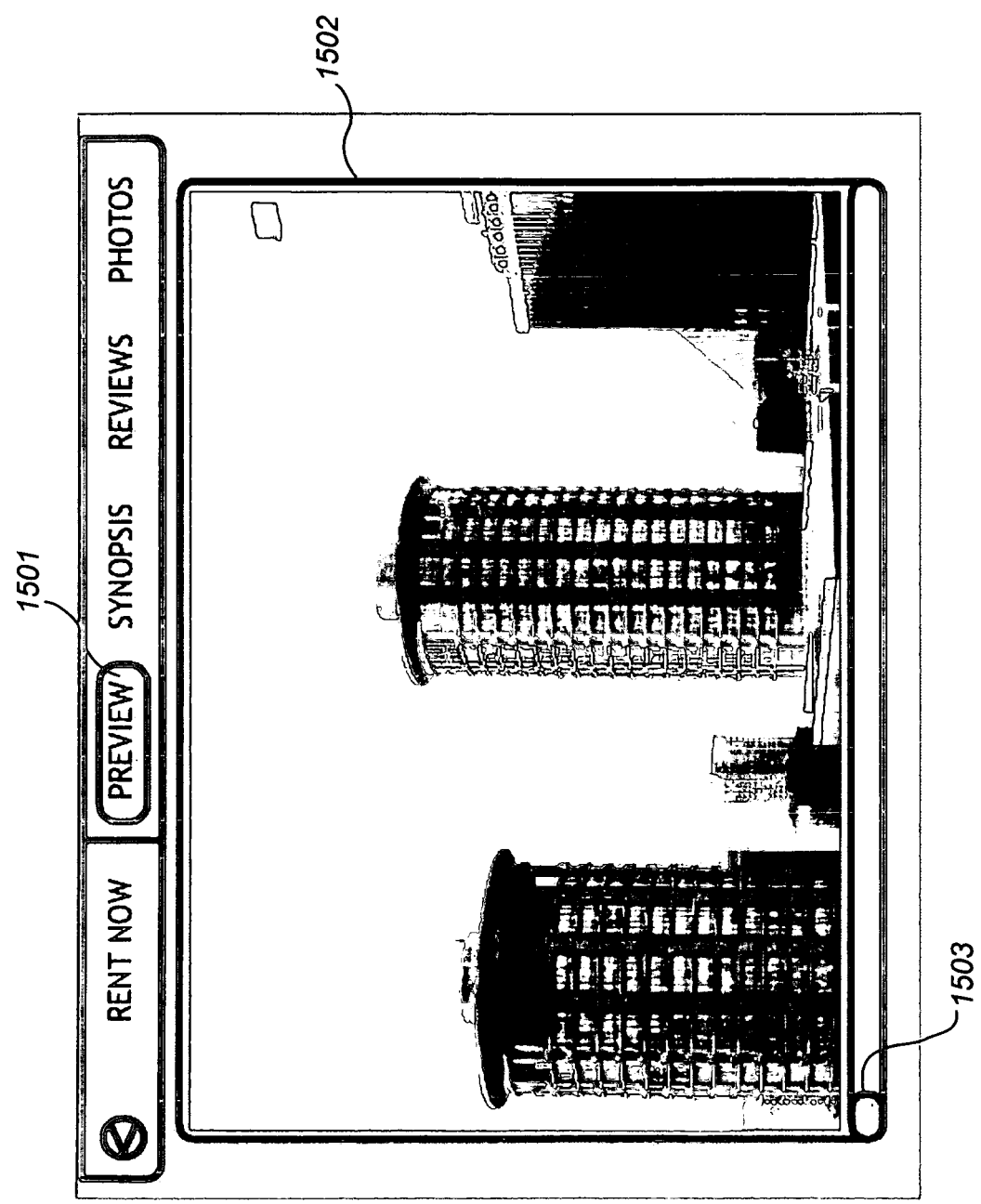
FIG. 15 is an example screen display of media acquired by an example quilt user interface of an example embodiment of a Device Independent Video Transaction System.

FIG. 15 is an example screen display of a media acquisition panel of an example quilt user interface provided by an example embodiment of a Device-Independent Video Transaction System. The MediaAcquire routine described with reference to FIG. 14 may receive indications of user actions from, and direct the presentation of media onto, this user interface. For example, a user may select the preview button 1501, which results in the MediaAcquire routine initiating the acquisition of a specified media title. As portions of the specified media are received, the MediaAcquire routine may initiate the display of image data (e.g., a video frame) onto the video area 1502 and/or update the preview slider 1503. The preview slider 1503 may in some embodiments also be manipulated by the user in order to seek or otherwise control the playback of a given media title.

Figure 16:
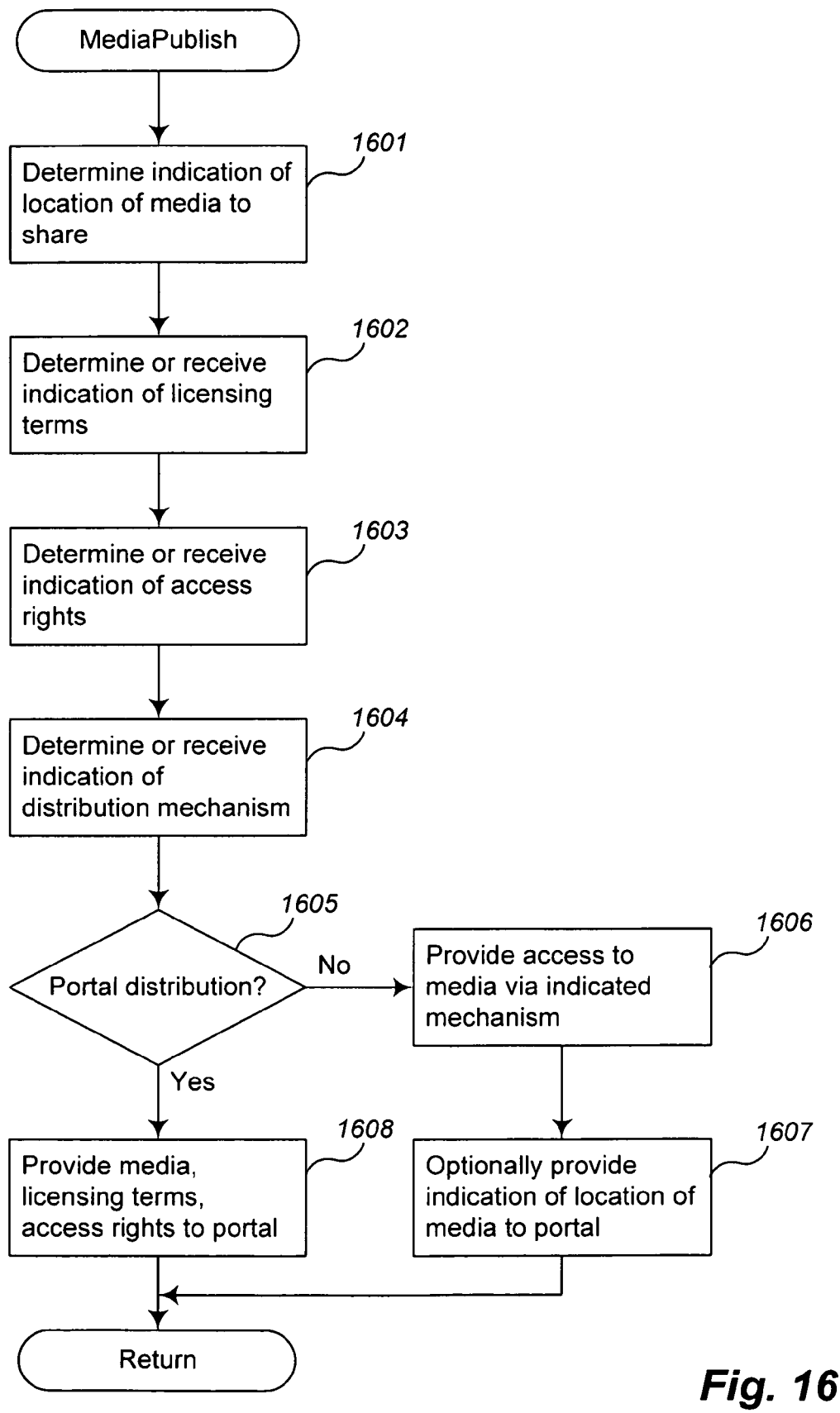
FIG. 16 is an example flow diagram of an example media publishing routine provided by an example embodiment of a Device Independent Video Transaction System.

Referring back to FIG. 2, step 205, in a typical embodiment of the DIVTS user interface, a user can also publish media to share media with others. FIG. 16 is an example flow diagram of an example media publishing routine provided by an example embodiment of a Device-independent Video Transaction System. The routine may be provided by, for example, the media publishing engine 406 of FIG. 4. The MediaPublish routine gathers information from a user related to the sharing of media and provides media sinks with access to such media.

More specifically, in step 1601, the routine determines an indication of the location of media to be shared. In some embodiments, such an indication may be represented by, for example, a URL that is passed to the user interface through, for example, user input. In step 1602, the routine determines or receives an indication of licensing terms. Licensing terms may include, for example, specifications of the allocation of legal rights in the media to be shared. For example, a user may indicate that the user desires the indicated media to be placed into the public domain, or alternatively that the user desires to maintain some rights (e.g., one or more of the exclusive legal rights provided by copyright law) in the indicated media to be shared. In step 1603, the routine determines or receives an indication of access rights. Such access rights may include, for example, groups of users, groups of devices, individual devices, and or individual users that the user wishes to grant or deny access to the indicated media to be shared. In step 1604, the routine determines or receives an indication of a distribution mechanism for sharing the indicated media. Various distribution mechanisms are contemplated, including peer-to-peer distribution and/or centralized distribution by, for example, a media portal such as the MTNP 308 described with reference to FIG. 3. An example MTNP is described further with reference to FIG. 20.

In step 1605, the routine determines whether the user has indicated that the media should be distributed via a portal or other centralized distribution mechanism. If not, the routine continues in step 1606, otherwise continues in step 1608. In step 1606, the routine provides access to the indicated media via the indicated distribution mechanism. In some embodiments, this may include making the media available for upload by one or more media sinks. Such a function may be performed by a modified version of the MediaPublish routine, or alternatively by way of turnkey media source such as a Web server, media streaming service, etc. In step 1607, the routine optionally provides an indication of the location of the media to one or more portal or other distribution systems, and then returns. This step may include providing a URL, IP ("Internet Protocol") address, or other indicator of available media such that the availability of the media may be advertised, promoted, or otherwise communicated to other users by way of a centralized or other distribution mechanism.

If it is instead determined in step 1605 that the user did indicate that the media should be distributed by portal or other centralized distribution mechanism, the routine proceeds to step 1608. In step 1608, the routine provides the indicated media, licensing terms, and access rights to the portal or other centralized distribution mechanism. The centralized distribution mechanism may then initiate the upload and storage of the indicated media to a remote system (e.g., a media streaming service, FTP server, peer-to-peer network, and/or a Web server) for purposes of further distribution. The routine then returns.

Figure 17:
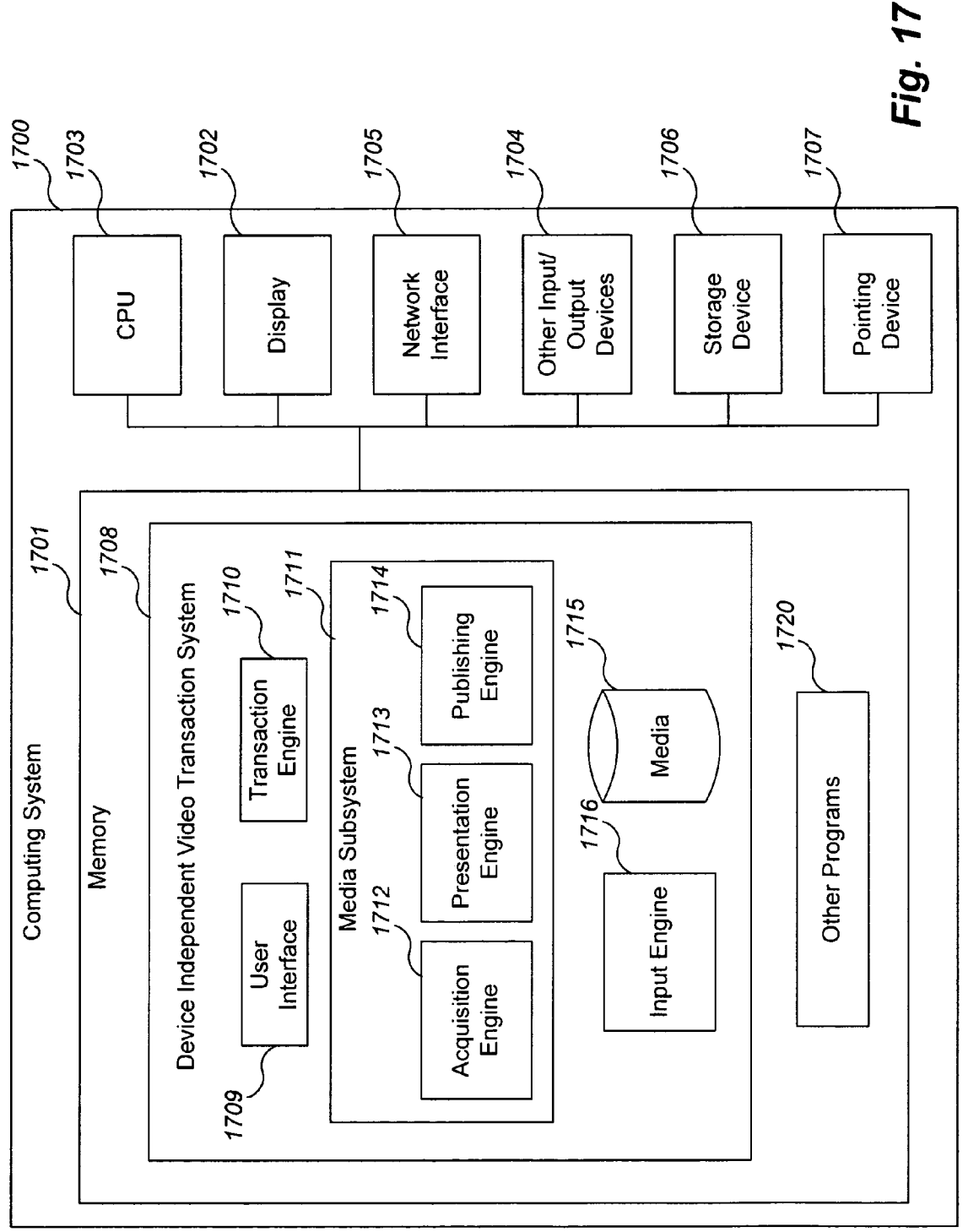
FIG. 17 is an example block diagram of a general purpose computer system for practicing example embodiments of a Device Independent Video Transaction System.

FIG. 17 is an example block diagram of a general purpose computer system for practicing example embodiments of a Device-Independent Video Transaction System. The general-purpose computer system 1700 may comprise one or more server and/or client computing systems and may span distributed locations. In addition, each block shown may represent one or more such blocks as appropriate to a specific embodiment or may be combined with other blocks. Moreover, the various blocks of the DIVTS 1708 may physically reside on one or more machines, which use standard or proprietary inter-process communication mechanisms to communicate with each other.

In the embodiment shown, computer system 1700 comprises a computer memory ("memory") 1701, a display 1702, a Central Processing Unit ("CPU") 1703, a network interface 1705, a storage device 1706, a pointing device 1707, and other Input/Output ("IO") devices 1704. The DIVTS 1708 is shown residing in the memory 1701. The components of the DIVTS 1708 preferably execute on CPU 1703. As described with reference to FIG. 4, an example DIVTS such as DIVTS 1708 comprises a user interface 1709, a transaction engine 1710, a media subsystem 1711, an optional media repository 1715, and an input engine 1716. The media subsystem 1711 comprises an acquisition engine 1712, a presentation engine 1713, and a publishing engine 1714. The input engine 1716 processes physical user input events received from, for example, the pointing device 1707 and/or other input devices 1704, by translating received physical input events into logical input events that may be consumed by other components such as the user interface 1709. Other programs 1720 may also reside in the memory 1701, and preferably execute on the one or more CPU's 1703. Various implementation approaches and/or architectures are contemplated, and are described further with reference to FIG. 18.

Figure 18:
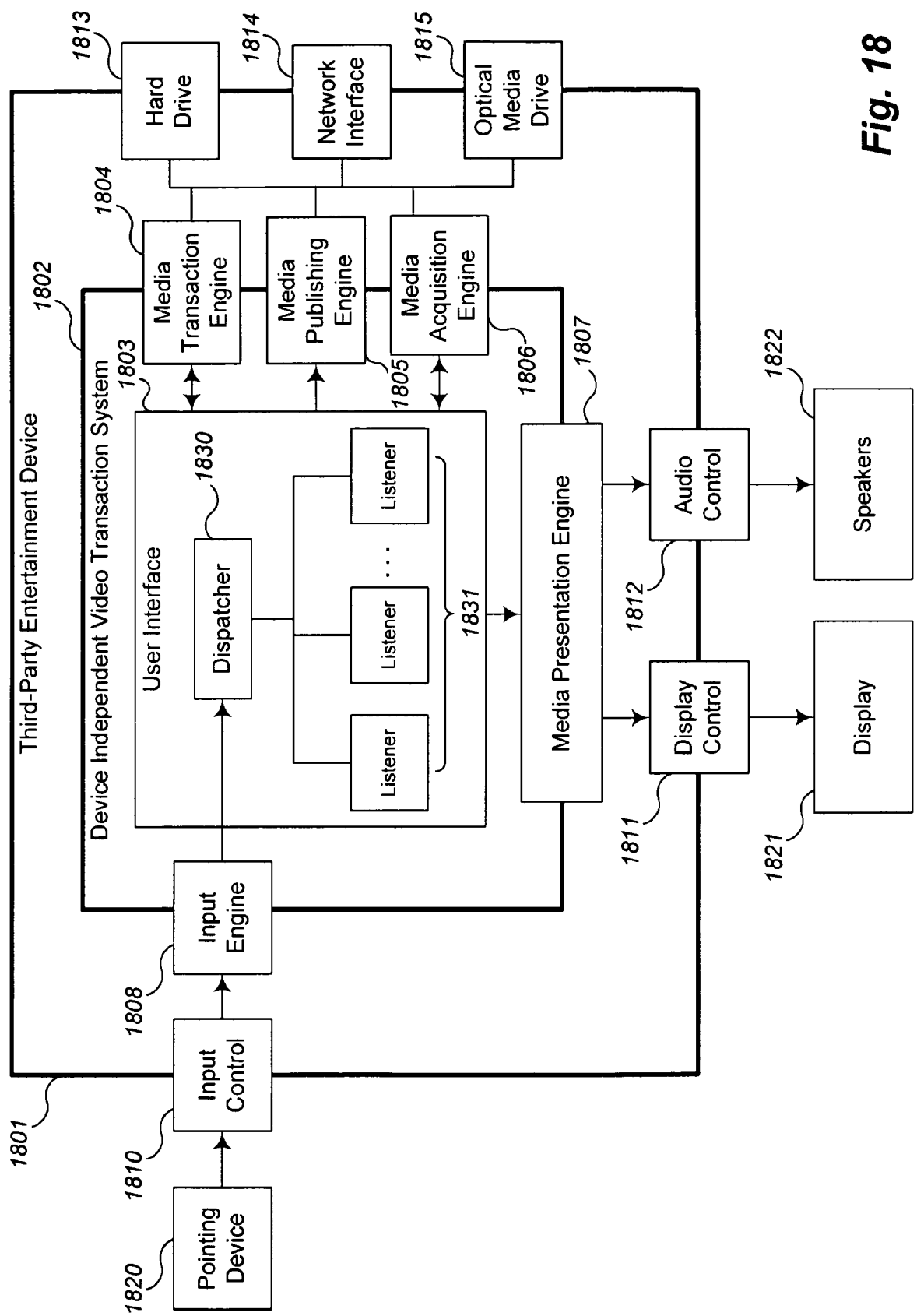
FIG. 18 is an example block diagram of an example embodiment of a Device Independent Video Transaction System implemented on a third-party entertainment device.

FIG. 18 is an example block diagram of further details of an example embodiment of a Device-Independent Video Transaction System implemented on a third-party entertainment device in a device-independent manner. The third-party entertainment device 1801 includes a DIVTS 1802, an input control 1810, a display control 1811, an audio control 1812, a hard drive 1813, a network interface 1814, and an optical media drive 1815. The DIVTS 1802 comprises a user interface 1803, media transaction engine 1804, a media publishing engine 1805, a media acquisition engine 1806, a media presentation engine 1807, and an input engine 1808. The user interface 1803 further comprises a dispatcher 1830 and multiple listeners 1831.

In typical operation, the input control 1810 of the third-party device is connected in this example embodiment to a pointing device 1820, such as a joystick or remote controller. The input control 1810 comprises a hardware/software/firmware interface that receives input events generated by the pointing device 1820 and provides them to the input engine 1808. The input engine 1808, in turn, translates a physical input event received from the input control 1810 into a logical, device-independent input event that is provided to the dispatcher 1830. The dispatcher 1830 passes the logical input event along to any listeners 1831 that have expressed interest in input events of that type (e.g., by registering themselves as being available to handle a particular class or type of event). An example dispatcher routine is discussed further with reference to FIG. 19. The listeners that have interest in that input event then may perform actions such as initiating or terminating the presentation of media by the media presentation engine 1807, initiating the acquisition of media by the media acquisition engine 1806, initiating a media transaction by the media transaction engine 1804, or initiating the sharing of media by the media publishing engine 1805.

For example, when media is received, the presentation engine 1807 pushes the media in the form of audio and/or video data to the display control 1811 and/or the audio control 1812. The display control may be, for example, a display driver (software) and/or hardware/firmware that transforms, renders, and/or otherwise controls the display 1821 to show image data. The audio control may be, for example, an audio driver and/or hardware/firmware that controls the connected speakers 1822 to produce sounds. The display 1821 and speakers 1822 may be resident on the device 1801 or connected in some manner, such as by a communications mechanism. When one of the listeners 1831 initiates the acquisition of media, the media acquisition engine 1806 acquires the media, for example, as described with reference to FIGS. 14 and 15. When one of the listeners 1831 initiates a transaction related to media, the media transaction engine 1804 initiates or performs transactions related to media such as those described with reference to FIGS. 9 and 10. Note that the media transaction engine 1804 may operate in conjunction with other systems and/or services, local or external, such as independent vendors that provide financial authorization. When one of the listeners 1831 indicates that the user desires to share media, the media publishing engine 1805 is activated as described with reference to FIG. 16.

Figure 19:
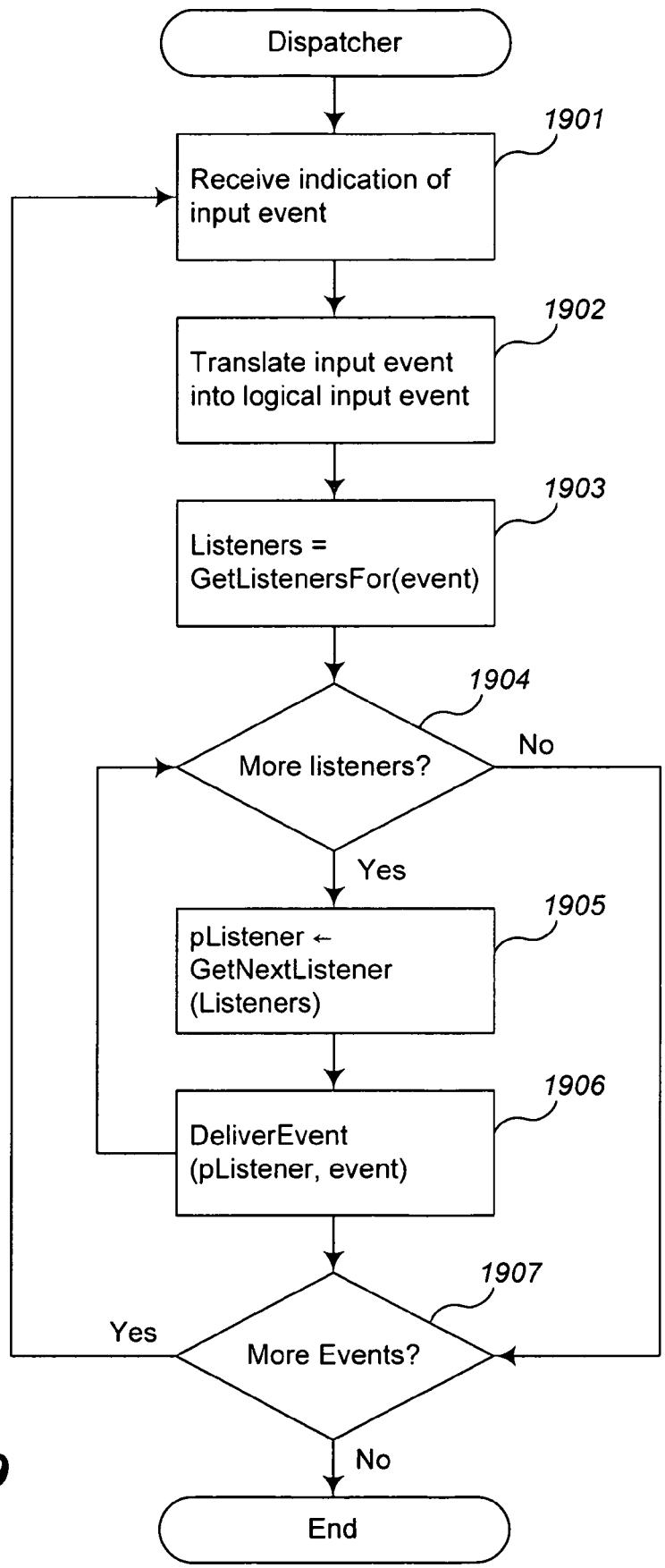
FIG. 19 is an example flow diagram of an example dispatcher routine provided by an example embodiment of a Device Independent Video Transaction System.

FIG. 19 is an example flow diagram of an example Dispatcher routine provided by an example embodiment of a Device-Independent Video Transaction System. The routine may be provided by, for example, the dispatcher of FIG. 18. The Dispatcher routine performs a loop in which it repeatedly receives input events and passes them along to the appropriate listeners. The listeners are typically software components that register themselves with the dispatcher to receive one or more designated events. Specifically, in step 1901, the routine receives an indication of an input event. Such input events may include inputs generated by and received from a variety of hardware devices including, but not limited to, keyboards, mice, touch pads, touch screens, joysticks, and/or remote controllers. In step 1902, the routine translates the physical input event received in step 1901 to a logical, device-independent input event. In step 1903, the routine determines the set of listeners that have expressed interest in receiving notifications of the logical input event of step 1902.

Next, in the loop defined by steps 1904-1906, the routine distributes the logical input event to each listener of the set of listeners determined in step 1903. In step 1904, the routine determines whether there are any more listeners in the set of listeners. If not, the routine continues in step 1907 and exits processing the designated input event, else continues in step 1905. In step 1905, the routine determines the next listener in the set of listeners. In step 1906, the routine delivers the logical input event to the listener determined in step 1905, and returns to the beginning of the loop to continue to process the designated input event in step 1904.

In step 1907, the routine determines whether to continue processing a next input event, and, if so, returns to step 1901.

The routine may proceed in step 1901 if, for example, additional events are waiting to be processed. Otherwise, the routine ends, or enters a waiting state until the next input event arrives. Note that in one embodiment, the Dispatch routine of FIG. 19 is implemented as or similar to an interrupt handler (e.g., a device driver routine), which is invoked by means of a software or hardware, interrupt caused by the input device. Other programming techniques are also contemplated and will operate to process input events in a similar device-independent manner.

Figure 20:
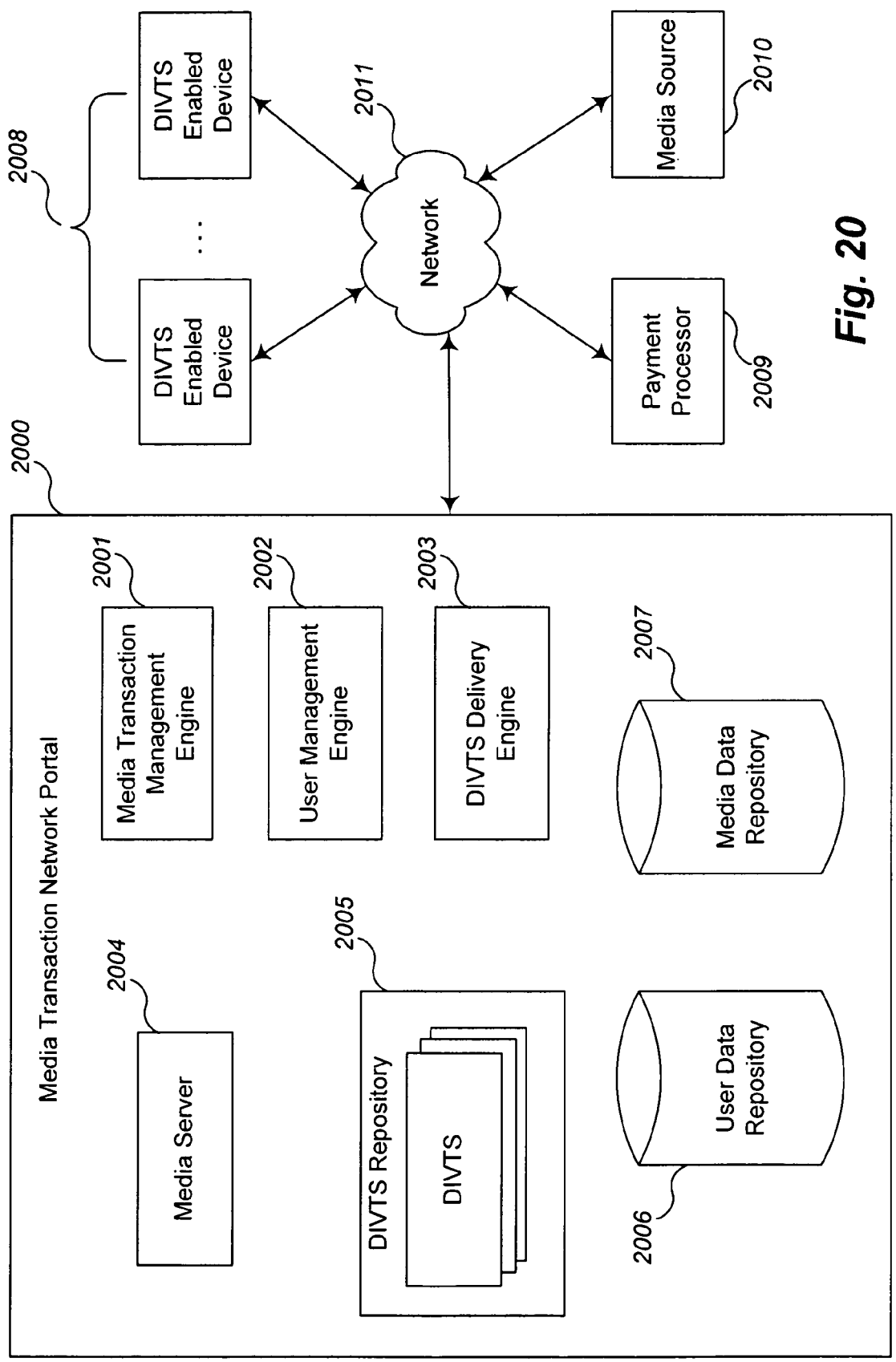
FIG. 20 is an example block diagram of components of an example embodiment of a Media Transaction Network Portal.

Referring back to FIG. 1, embodiments of a DIVTS may interact with a Media Transaction Network Portal in order to transact for media as well as perform other functions. FIG. 20 is an example block diagram of components of an example embodiment of a Media Transaction Network Portal. A Media Transaction Network Portal ("MTNP") provides functions for performing media transactions, providing Device-Independent Video Transaction Systems to third-party devices, and providing media in the context of a Media Transaction Network inhabited by one or more DIVTS-enabled devices. In addition, the MTNP may handle user account operations such that users of the MTNP may establish identities with the MTNP for purposes of storing preferences (e.g., favorite media categories), provide information to be shared with other users (e.g., media and/or metadata related to such media including ratings and reviews), and/or storing payment information (e.g., credit card information) for purposes of obtaining rights to acquire media and/or goods or services related to such media.

The illustrated MTNP 2000 comprises a media transaction management engine 2001, a user management engine 2002, a DIVTS delivery engine 2003, a media server 2004, a DIVTS repository 2005, a user data repository 2006, and a media data repository 2007. One or more of these components may be optional in any particular embodiment, and each block shown may represent one or more such blocks as appropriate to a specific embodiment or may be combined with other blocks. Moreover, the various blocks of the MTNP 2000 may physically reside on one or more machines, which use standard or proprietary inter-process communication mechanisms to communicate with each other. The media transaction management engine 2001 handles media transactions such as those described with reference to FIG. 9 that are initiated by one or more DIVTS-enabled devices 2008. Handling media transactions may entail interacting over a network 2011 with a payment processor system 2009 that may be operated by a third party. Examples of payment processors include credit card payment processors and/or electronic funds transfer systems. The user management engine 2002 handles user registration and other user-related functions and stores data related to such operations in the user data repository 2006. The DIVTS delivery engine 2003 provides instances of DIVTS stored in the DIVTS repository 2005 or generated automatically to be installed on third-party devices. A DIVTS instance may be represented in machine or object code that is native to a particular target computing system or alternatively in a higher-level instruction format including virtual machine bytecode and/or source code that may be interpreted by a virtual machine or other interpreter executing on the target computing system (i.e., the third-party device). The media server 2004 operates as a media source to provide media that may be stored in the media data repository 2007 to one or more DIVTS-enabled devices 2008. Media servers include, for example, streaming media servers, Web servers, FTP ("File Transfer Protocol") servers, etc. In addition, the MTNP 2000 may interact over the network 2011 with a media source 2010 in order to upload or otherwise obtain media or indications of media for purposes of distribution, advertisement, etc.

Figure 21:
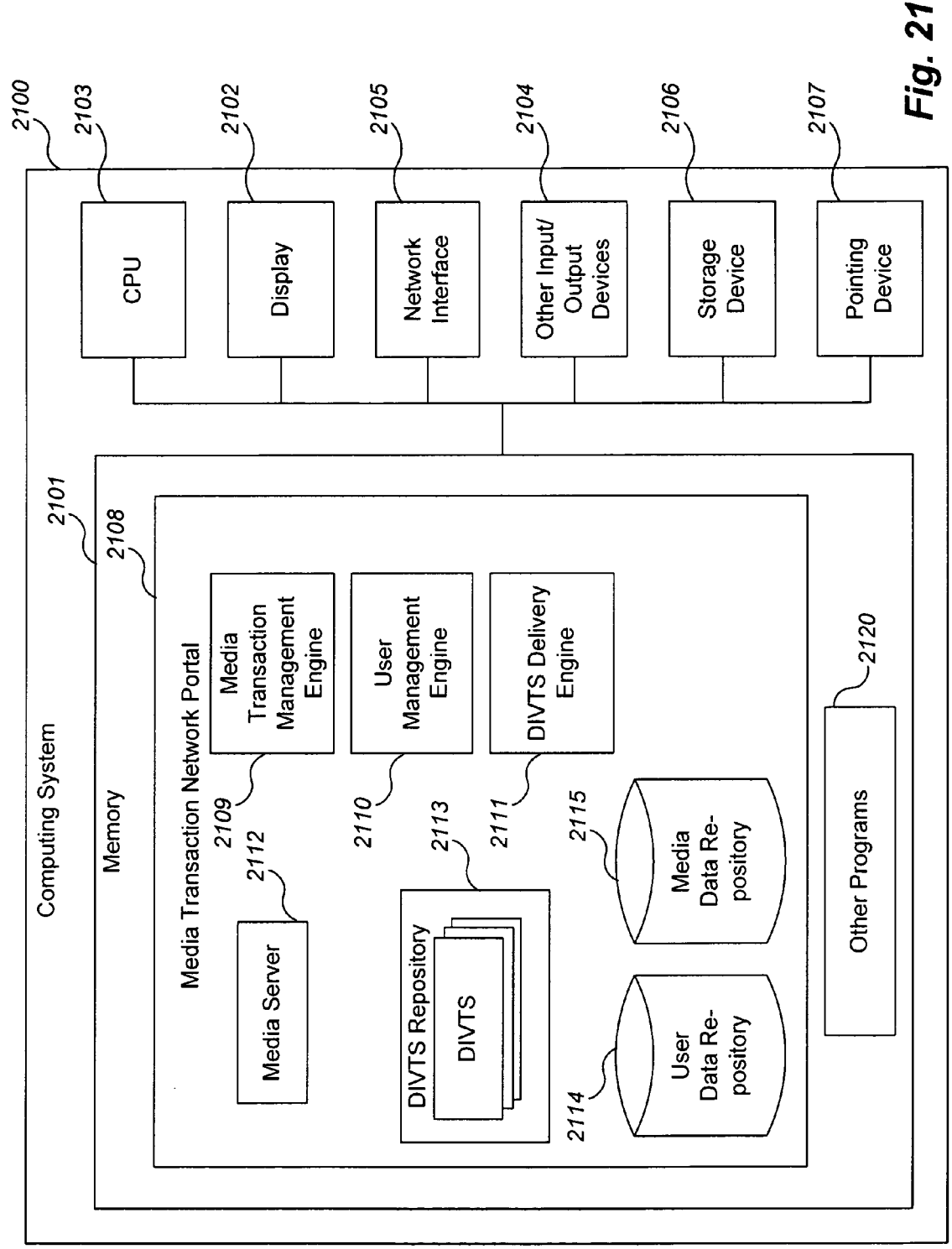
FIG. 21 is an example block diagram of a general purpose computer system for practicing example embodiments of a Media Transaction Network Portal.

FIG. 21 is an example block diagram of a general purpose computer system for practicing example embodiments of a Media Transaction Network Portal. The general-purpose computer system 2100 may comprise one or more server and/or client computing systems and may span distributed locations. In addition, each block shown may represent one or more such blocks as appropriate to a specific embodiment or may be combined with other blocks. Moreover, the various blocks of the MTNP 2108 may physically reside on one or more machines, which use standard or proprietary inter-process communication mechanisms to communicate with each other.

In the embodiment shown, computer system 2100 comprises a computer memory ("memory") 2101, a display 2102, a Central Processing Unit ("CPU") 2103, a network interface 2105, a storage device 2106, a pointing device 2107, and other Input/Output ("IO") devices 2104. The MTNP 2108 is shown residing in the memory 2101. The components of the MTNP 2108 preferably execute on CPU 2103. As described with reference to FIG. 20, an example MTNP comprises media transaction management engine 2109, a user management engine 2110, a DIVTS delivery engine 2111, and a media server 2112, a DIVTS repository 2113, a user data repository 2114, and a media data repository 2115. Other programs 2120 also reside in the memory 2101, and preferably execute on the one or more CPU's 2103.

In the example embodiments shown in FIGS. 17 and 21, components of the DIVTS and the MTNP can be implemented using standard programming techniques. A range of programming languages known in the art may be employed for implementing such example embodiments, including representative implementations of various programming language paradigms, including but not limited to, object-oriented (e.g., Java, C++, C#, Smalltalk), functional (e.g., ML, Lisp, Scheme, etc.), procedural (e.g., C, Pascal, Ada, Modula), scripting (e.g., Perl, Ruby, Python, etc.), etc. In addition, the various components of the illustrated embodiments may be implemented by way of a single monolithic executable running on a single CPU computer system, or alternately decomposed using a variety of structuring techniques known in the art, including but not limited to, multi-programming, multithreading, client-server, or peer-to-peer, running on one or more computer systems each having one or more CPUs.

In addition, programming interfaces to the data stored as part of the illustrated embodiments can be made available by standard means such as through C, C++, C#, and Java APIs or libraries for accessing files, databases, or other data repositories, or through Web servers, FTP servers, or other types of servers providing access to stored data. For example, the media data repository 1715 of FIG. 17 and the DIVTS repository 2113, the user data repository 2114, and the media data repository 2015 of FIG. 21 may be implemented by means of one or more database systems, file systems, or any other method known in the art for storing such information, or any combination of the above.

Also the example embodiments shown in FIGS. 17 and 21 may be implemented in a distributed environment that is comprised of multiple, even heterogeneous, computer systems and networks. For example, in one embodiment, the components 2109-2112 and the repositories 2113-2115 of FIG. 21 are all located in physically different computer systems. In another embodiment, various components 2109-2112 are hosted together on one machine, while the data repositories 2113-2115 are hosted on a hosted on a separate machine. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, etc.). Other variations are possible.

Different configurations and locations of code and data are contemplated for use with techniques of the present invention. In example embodiments, the components shown in FIGS. 17 and 21 and may execute concurrently and asynchronously; thus the components may communicate using well-known or proprietary message passing techniques. Equivalent synchronous embodiments are also supported by DIVTS and/or MTNP implementations.

Figure 22:
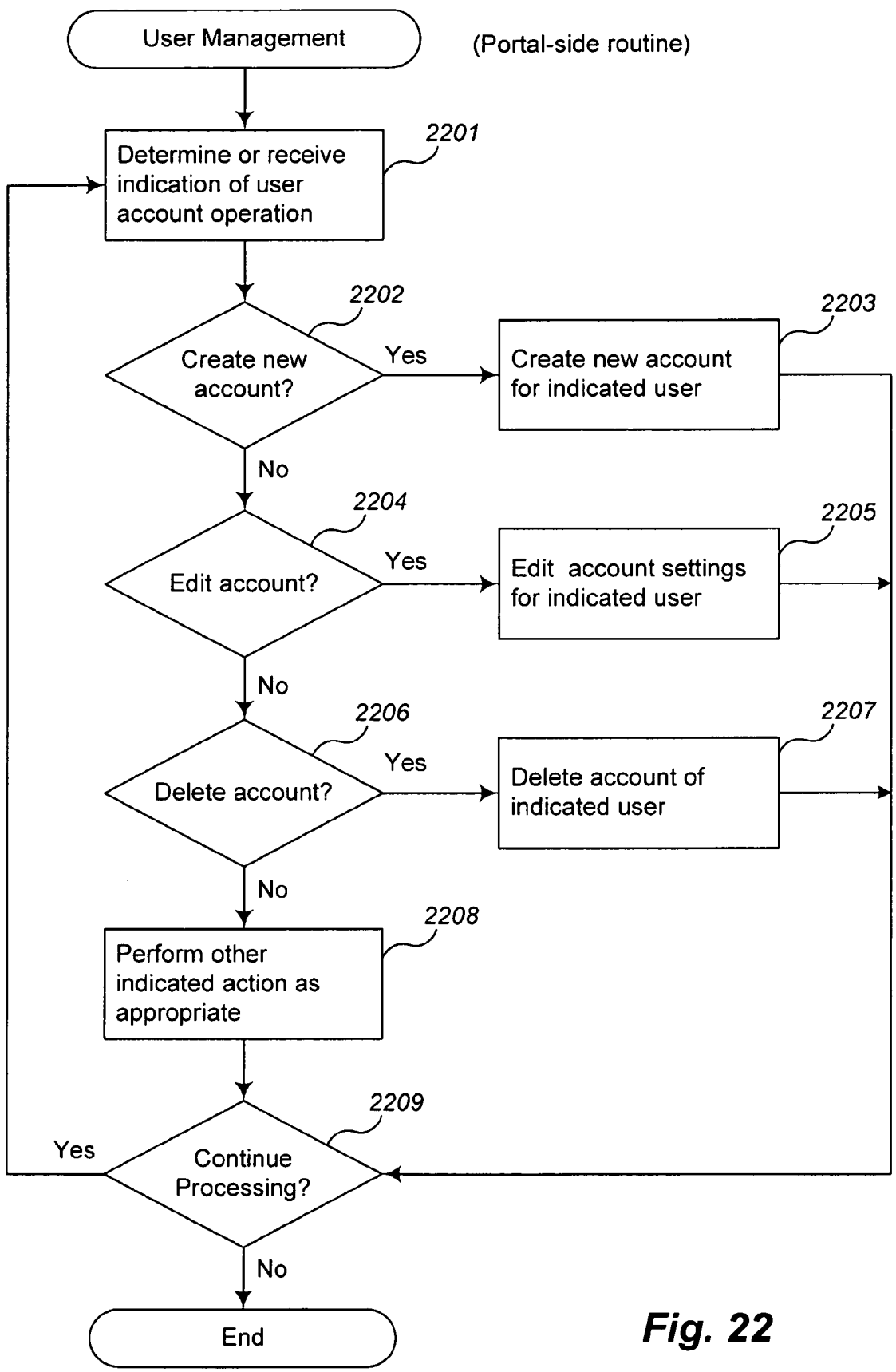
FIG. 22 is an example flow diagram of an example user management routine provided by an example embodiment of a Media Transaction Network Portal.
Figure 23:
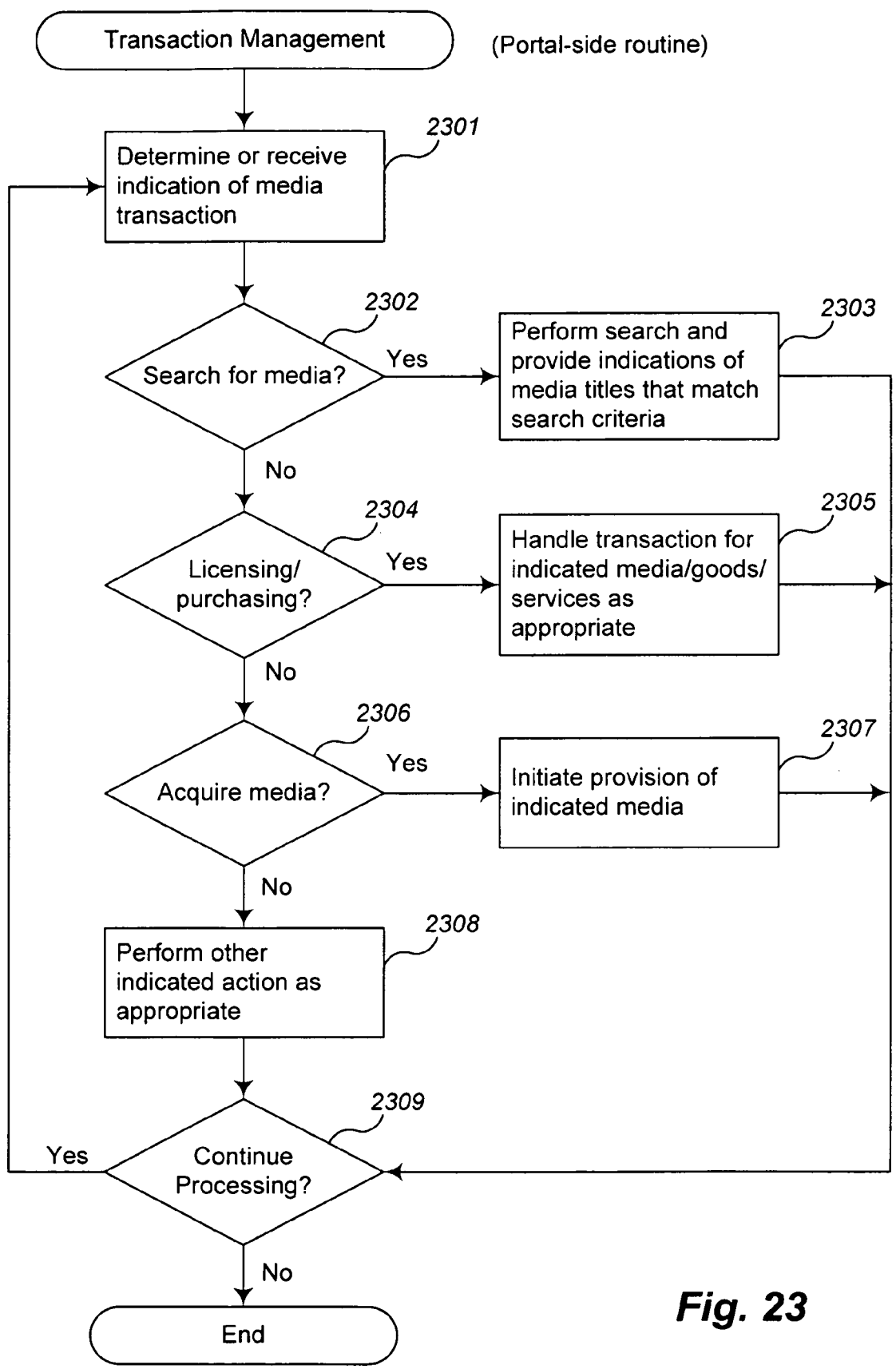
FIG. 23 is an example flow diagram of an example transaction management routine provided by an example embodiment of a Media Transaction Network Portal.
Figure 24:
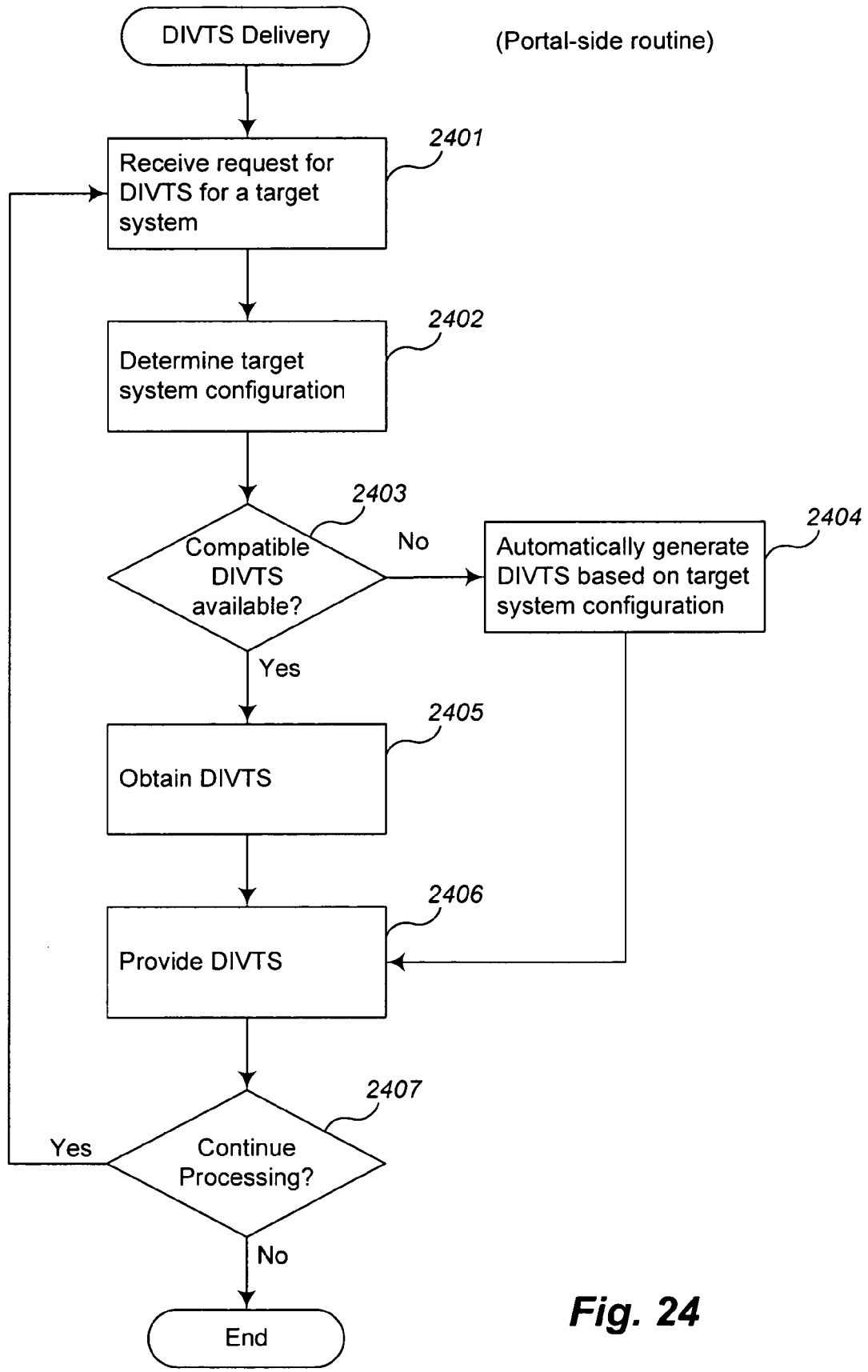
FIG. 24 is an example flow diagram of an example Device Independent Video Transaction System delivery routine provided by an example embodiment of a Media Transaction Network Portal.

FIGS. 22-24 describe example routines implemented by an example Media Transaction Network Portal used by DIVTS-enabled devices. FIG. 22 is an example flow diagram of an example User Management routine provided by an example embodiment of a Media Transaction Network Portal. The routine may be provided by, for example, the user management engine 2002 of the MTPN 2000 of FIG. 20. The User Management routine loops in steps 2201-2209 to receive and handle indications of user actions related to user identity for purposes of performing media transactions and other functions provided by the MTPN, such as providing media for acquisition and/or presentation. Specifically, in step 2201, the routine determines or receives an indication of a user account operation. In step 2202, the routine determines whether the indicated user account operation is to create a new user account. If so, the routine continues in step 2203, and creates a new account for the indicated user, otherwise continues in step 2204. In step 2204, the routine determines whether the indicated user account operation is to edit an existing user account. If so, the routine continues in step 2205, else continues in step 2206. In step 2205, the routine edits the account settings for the indicated user as appropriate. Such account settings may include preferences related to movie titles and/or categories of movies which the user may be interested in, payment options such as credit card information and/or bank account numbers, and contact information such as telephone numbers, physical street addresses and/or email addresses.

In step 2206, the routine determines whether the indicated user account operation is to delete an existing account. If so, the routine continues in step 2207 and deletes the account of the indicated user, otherwise proceeds to step 2208 and performs other indicated actions as appropriate. Other actions may include, for example, performing periodic housekeeping operations (e.g., log rotation), sending confirmations (e.g., for completed account operations and/or transactions) and/or updates (e.g., for newly available media) to users, etc.

After steps 2203, 2205, 2207, and 2208, the routine continues in step 2209 and determines whether to continue processing other operations. If so, the routine returns to the beginning of the loop in step 2201. Otherwise the routine ends, or alternatively enters a wait state to await the next operation.

FIG. 23 is an example flow diagram of an example Transaction Management routine provided by an example embodiment of a Media Transaction Network Portal. The routine may be provided by, for example, the media transaction management engine 2001 of the MTNP 2000 of FIG. 20. The Transaction Management routine performs a loop in steps 2301-2309 to perform or initiate the performance of indicated transactions as appropriate.

More specifically, in step 2301, the routine determines or receives an indication of a media transaction. In step 2302, the routine determines whether the indicated media transaction is a request to search for media titles. If so, the routine proceeds to step 2303, performs a search, and provides indications of media titles that match provided search criteria. Otherwise, the routine continues in step 2304 to determine whether the indicated media transaction is to either license or purchase media and/or goods and services related to media. If so, the routine continues to step 2305, else continues in step 2306. In step 2305, the routine handles the transaction for the indicated media and/or goods and/or services as appropriate. This may include performing a licensing transaction to obtain rights for the indicated media or to provide money or other items of value in exchange for indicated goods and services. The routine may in some embodiments interoperate with third-party payment processors to handle monetary transactions.

In step 2306, the routine determines whether the indicated media transaction is to acquire media. If so, the routine continues in step 2307 and initiates the provision of the indicated media, otherwise continues in step 2308. Initiating the provision of such media may include directing or otherwise notifying another component, such as the media server 2004 of FIG. 20, to stream or otherwise begin delivery of the indicated media to the requesting DIVTS.

In step 2308, the routine performs other indicated actions as appropriate. Other actions may include performing periodic housekeeping operations (e.g., log rotation), sending confirmations (e.g., for completed transactions) and/or providing updates (e.g., delivery or shipping notifications for items purchased on the MTNP) to users, etc. After steps 2303, 2305, 2307, and 2308, the routine continues in step 2309 to determine whether to continue processing. If so, the routine returns to the beginning of the loop in step 2301 to process additional transactions. Otherwise the routine ends.

FIG. 24 is an example flow diagram of an example Device-Independent Video Transaction System Delivery routine provided by an example embodiment of a Media Transaction Network Portal. Such a routine may be provided by, for example, the DIVTS delivery engine 2003 of FIG. 20. In steps 2401-2407, the DIVTS Delivery routine performs a (potentially continuous) loop to provide a DIVTS instance configured to execute on the requesting device.

Specifically in step 2401, the routine receives a request from a target system for a DIVTS. In step 2402, the routine determines the target system configuration. In some embodiments, the received request of step 2401 may include a description of the target system. The description of the target system may include information related to the hardware and/or software configuration of the third party entertainment device upon which a DIVTS is to be installed. In step 2403, the routine determines whether a compatible DIVTS is already available, and, if so, continues in step 2405, else continues in step 2404. The routine may make this determination by inspecting the target system configuration as determined in step 2402, and determining whether a DIVTS has been previously generated that matches the determined target system configuration. Alternatively, the routine may be able to automatically determine the target system by way of executing some amount of test instructions to be answered by the device.

If a compatible DIVTS is determined to not be available, the routine proceeds to step 2404. In step 2404, the routine automatically generates a DIVTS based on the target system configuration. The automatically generated DIVTS may also be stored for future retrieval by target devices of the same type. This step may include automatically compiling and/or linking preexisting source and/or object modules to create a DIVTS instance that is operative on and/or compatible with the target system.

If it is instead determined in step 2403 that a compatible DIVTS is already available, the routine proceeds to step 2405 and obtains the compatible DIVTS. Obtaining a compatible DIVTS may include accessing a DIVTS repository such as the DIVTS repository 2005 described further with reference to FIG. 20.

After steps 2405 and 2404, the routine continues in step 2406 and provides the determined DIVTS instance to the requesting system. In step 2407, the routine determines whether to continue processing, and if so, returns to the beginning of the loop in step 2401. Otherwise, the routine ends.

All of the above U.S. patents, U.S. patent application publications, U.S. patent applications, foreign patents, foreign patent applications and non-patent publications referred to in this specification and/or listed in the Application Data Sheet, including but not limited to U.S. Provisional Patent Application No. 60/669,294, entitled "DEVICE-INDEPENDENT ON-DEMAND VIDEO DELIVERY MECHANISM," filed Apr. 6, 2005; and U.S. Provisional Patent Application No. 60/756,251, entitled "METHOD AND SYSTEM FOR DEVICE-INDEPENDENT ON-DEMAND DIGITAL CONTENT DELIVERY," filed Jan. 3, 2006 are incorporated herein by reference, in their entirety.

From the foregoing it will be appreciated that, although specific embodiments have been described herein for purposes of illustration, various modifications may be made without deviating from the spirit and scope of the present disclosure. For example, the methods and systems for performing media related transactions discussed herein are applicable to uses other than for transactions related to video. Also, the methods and systems discussed herein are applicable to differing protocols, communication media (optical, wireless, cable, etc.) and devices (such as wireless handsets, electronic organizers, personal digital assistants, portable email machines, game machines, pagers, navigation devices such as GPS receivers, etc.).

The invention claimed is:

1. A method in a single computing device for interacting with a user operating a video transaction system installed on the single computing device, comprising:

generating a graphical representation comprising multiple panels of a quilt-based user interface, the graphical representation indicating a geometric layout of the multiple panels, each panel being connected to at least one other of the multiple panels and having at least one associated action that initiates invocation of at least one of multiple functions provided by the video transaction system, the multiple functions including at least video item transaction initiation, video item acquisition, and video item presentation;

presenting a first one of the multiple panels as a current panel, the first panel displaying indicators of multiple categories of video items associated with the first panel, and the first panel substantially obscuring a second one of the multiple panels, the second panel having an associated selected category of video items;

in response to a first received input event that selects one of the indicated multiple categories of video items associated with the first panel, wherein the selected category of video items associated with the first panel is not contained by the selected category of video items associated with the second panel, identifying a third one of the multiple panels as the current panel, the third panel displaying indicators of multiple video items that are each included in both the selected category of video items associated with the first panel and the selected category of video items associated with the second panel, and animating a transition from the first panel to the third panel to cause the third panel to be displayed, the third panel displaying a connector to the first panel and a connector to the second panel, the connector to the first panel indicating the selected category of video items associated with the first panel, and the connector to the second panel indicating that the first panel substantially obscures the second panel; and in response to a second received input event that selects a video item from the indicators of multiple video items displayed in the third panel, animating navigation amongst at least some of the multiple panels other than the first, second, and third panels, the at least some panels providing information about the selected video item, the animating including displaying the connections between the at least some panels, so that the geometric layout of the multiple panels relative to each other is evident to the user.

2. The method of claim 1 wherein presenting the first one of the multiple panels includes displaying the first panel using a viewport that constrains display of the multiple panels, wherein the viewport is invisible to a user and the animating the transition is perceived by the user as the display shifting from the first panel to the second panel.

3. The method of claim 1, the video item acquisition function comprising obtaining at least some of a specified video item from a video source.

4. The method of claim 1, the video item transaction initiating function comprising initiating payment of money in exchange for goods and/or services related to specified video items.

5. The method of claim 1, the video item transaction initiating function comprising initiating a search for video items based at least in part on one or more specified categories.

6. The method of claim 1, the video item presentation function comprising initiating display of a portion of an acquired video item on a display device coupled to the single computing device.

7. The method of claim 1, further comprising displaying the second panel such that it appears to be at least partially on top of the first panel and presenting an indication that the first panel is under the second panel.

8. The method of claim 1, the animating the transition from the first panel to the third panel further comprising shifting the first panel out of a viewport while shifting the second panel into the viewport.

9. The method of claim 1 wherein the at least one action associated with each of the at least some of the multiple panels other than the first, second, or third panels comprises at least one of presenting a preview of the selected video item, presenting a review of the selected video item, presenting an image from the selected video item, or presenting a synopsis of the selected video item.

10. The method of claim 1 wherein at least some of the multiple panels are automatically generated based at least in part on a media categorization data structure.

11. The method of claim 1 wherein the multiple functions further include video item publishing by providing an indication of the selected video item to a media sink via a network connection.

12. A method in a single computing device for interacting with a user operating a media transaction system installed on the single computing device, comprising:

generating a graphical representation of a quilt-based user interface comprising multiple panels, each panel being connected to at least one other of the multiple panels and having at least one associated action that initiates invocation of at least one of multiple functions provided by the media transaction system;

presenting a first one of the multiple panels as a current panel, the first panel displaying indicators of multiple categories of media items associated with the first panel, and the first panel substantially obscuring a second one of the multiple panels, the second panel having an associated selected category of media items;

in response to a first received input event that selects one of the indicated multiple categories of media items associated with the first panel,
identifying a third one of the multiple panels as the current panel, the third panel displaying indicators of multiple media items that are each included in both the selected category of media items associated with the first panel and the selected category of media items associated with the second panel; and
animating a transition from the first panel to the third panel to cause the third panel to be displayed, the third panel displaying a connector to the first panel and a connector to the second panel, the connector to the first panel indicating the selected category of media items associated with the first panel, and the connector to the second panel indicating that the first panel substantially obscures the second panel; and in response to a second received input event that selects a media item from indicators of multiple media items displayed by the third panel,
presenting a fourth panel of the multiple panels; and
initiating performance of the at least one action associated with the fourth panel, the action relating to at least one of acquiring the selected media item, performing a transaction related to the selected media item, or presenting a portion of the selected media item.

13. The method of claim 12 wherein the first or second received input event is at least one of an up event, a down event, a left event, a right event, or a select event.

14. The method of claim 12 wherein the second received input event is a directional input event having an associated direction, the third panel is connected to the fourth panel in the associated direction, and the fourth panel is presented in response to the second received input event.

15. The method of claim 14 wherein the associated direction is one of up, down, left, right.

16. The method of claim 14 wherein the fourth panel is presented in place of the third panel.

17. The method of claim 12 wherein the second received input event is a select input event, and wherein the fourth panel is presented in response to the second received input event.

18. The method of claim 12 wherein the presenting the fourth panel comprises animating a transition from the third panel to the fourth panel, the animating including displaying a connection between the third and fourth panel, so that positions of the third and fourth panels relative to each other are evident to the user.

19. The method of claim 18 wherein the animating the transition from the third panel to the fourth panel comprises shifting the third panel out of a viewport and shifting the fourth panel into the viewport.

20. The method of claim 19 wherein the shifting the third panel out of the viewport and shifting the fourth panel into the viewport comprises presenting a perception of a smooth transition from the third panel to the fourth panel.

21. The method of claim 18 wherein the animating the transition from the third panel to the fourth panel further comprises a zooming or panning operation.

22. The method of claim 12, further comprising:
presenting results of a media item search based at least in part on the selected category of media items associated with the first panel and the selected category of media items associated with the second panel.

23. The method of claim 22 wherein the selected category of media items associated with the first panel contains a first set of one or more media items, the selected category of media items associated with the second panel contains a second set of one or more media items, and the media item search comprises performing a set intersection of the first set of one or more media items and the second set of one or more media items.

24. The method of claim 22 wherein displaying the first panel includes presenting an indication that suggests that the first panel is over the second panel.

25. The method of claim 12 wherein the at least some of the multiple panels are automatically generated based at least in part on a data structure that represents categories of media items.

26. The method of claim 25 wherein the data structure is a media categorization graph comprising multiple nodes each indicating a category or a media item, and each connected to at least one of the multiple nodes.

27. The method of claim 12, further comprising:
highlighting, in response to the first received input event, the selected category of media items associated with the first panel.

28. The method of claim 27 wherein the first received input event is an up event or a down event.

29. The method of claim 12 wherein the multiple panels of the quilt-based user interface appear to be laid out on a single plane and further comprising presenting the first panel from -an orientation perpendicular to the quilt-based user interface, thereby providing a viewing perspective of the first panel that is orthogonal to the plane of the quilt-based user interface.

30. The method of claim 29 wherein the orientation is adjustable in response to a received input event.

31. The method of claim 29 wherein the orientation is provided using a viewport that supports panning and/or zooming from different angles relative to the plane of the quilt-based user interface.

32. The method of claim 12, further comprising using a viewport to present one or more of the multiple panels.

33. The method of claim 32 wherein the viewport supports an operation to zoom in and/or zoom out to display fewer or more, respectively, of the multiple panels in response to a received input event.

34. The method of claim 12, the presenting the portion of the selected media item comprising initiating display of the portion of the selected media item on a display device coupled to the single computing device.

35. The method of claim 12, the performing the transaction related to the selected media item comprising initiating payment of money in exchange for goods and/or services related to the selected media item.

36. The method of claim 35 wherein the goods include items portrayed in the selected media item.

37. The method of claim 12 wherein the media transaction system is a video transaction system.

38. The method of claim 12, the presenting the first panel comprising initiating display of the first panel on a display device coupled to the single computing device.

39. The method of claim 12 wherein the first received input event is received from a user input device communicatively coupled to the single computing device.

40. The method of claim 12 wherein the user input device is at least one of a joystick, a mouse, a pointing device, a remote controller, a button, or a keyboard.

41. The method of claim 12 wherein the single computing device is at least one of a desktop computing system, a laptop computing system, a set top box, a gaming system, a palmtop computing system, or a cellular telephone.

42. A computer readable memory medium whose contents enable a single computing device to interact with a user operating a media transaction system installed on the single computing device, by performing a method comprising:
  generating a representation of a quilt-based user interface comprising multiple panels, each panel being connected to at least one other of the multiple panels and having at least one associated action for initiating invocation of at least one of a plurality of media transaction functions;
  presenting a first one of the multiple panels, the first panel displaying indicators of multiple categories of media items associated with the first panel, and the first panel substantially obscuring a second one of the multiple panels, the second panel having an associated selected category of media items;
  in response to a first received input event, that selects one of the indicated multiple categories of media items associated with the first panel,
    identifying a third one of the multiple panels as the current panel, the third panel displaying indicators of multiple media items that are each included in both the selected category of media items associated with the first panel and the selected category of media items associated with the second panel; and
    animating a transition from the first panel to the third panel to cause the third panel to be displayed, the third panel displaying a connector to the first panel and a connector to the second panel, the connector to the first panel indicating the selected category of media items associated with the first panel, and the connector to the second panel indicating that the first panel substantially obscures the second panel; and
  in response to a second received input event that selects a media item from indicators of multiple media items displayed by the third panel,
    presenting a fourth panel of the multiple panels; and
    initiating performance of the at least one action associated with the fourth panel, the action relating to at least one of acquiring the selected media item, performing a transaction related to the selected media item, or presenting a portion of the selected media item.

43. The computer readable memory medium of claim 42 wherein the computer readable memory medium is a memory of a computing system.

44. The computer readable memory medium of claim 42 wherein the contents are instructions that, when executed, cause the computing system to perform the method.

45. The computer readable memory medium of claim 42 wherein the second received input event is a directional input event having an associated direction, the third panel is connected to the fourth panel in the associated direction, and the fourth panel is displayed in response to the second received input event.

46. The computer readable memory medium of claim 42, the presenting the fourth panel comprising animating a transition from the third panel to the fourth panel.

47. The computer readable memory medium of claim 42 wherein the identified panel includes multiple indications of media title categories, the received input event is a selection one of the multiple indications of media title categories, and further comprising:
  initiating a search in response to the first received input event; and
  displaying the third panel with contents based at least in part on the search, the contents including the multiple indicators of media items.

48. The computer readable memory medium of claim 42 wherein at least some of the multiple panels are automatically generated based at least in part on a media categorization graph.

49. The computer readable memory medium of claim 42 wherein the selected category of media items associated with the first panel is highlighted in response to the first received input event.

50. The computer readable memory medium of claim 42 wherein presenting a portion of the selected media item comprises initiating display of the portion of the selected media item on a display device coupled to the single computing device.

51. The computer readable memory medium of claim 42 wherein performing the transaction related to the selected media item comprises initiating payment of money in exchange for goods and/or services related to the selected media item.

52. The computer readable memory medium of claim 42 wherein acquiring the selected media item comprises obtaining at least some of the selected media item from a video source.

53. A graphical user interface that enables a single computing device to interact with a user operating a media transaction system installed on the single computing device, the user interface comprising:
  an arrangement of multiple panels that together present a quilt metaphor, each connected to at least one other of the multiple panels, each panel having at least one associated action that causes invocation of at least one of a plurality of functions provided by the media transaction system;
  a dispatcher configured to, in response to a received input event associated with an identified panel, initiate performance of the action associated with the identified panel, the action relating to at least one of determining a selected media, performing a transaction related to the selected media, or presenting a portion of the selected media; and
  a display mechanism configured to present the at least the identified panel in response to an indication from the dispatcher by animating a smooth transition from a prior presented panel to the identified panel.

* * * * *

UNITED STATES PATENT AND TRADEMARK OFFICE
CERTIFICATE OF CORRECTION

PATENT NO. : 7,600,243 B2 Page 1 of 1
APPLICATION NO. : 11/392259
DATED : October 6, 2009
INVENTOR(S) : Cameron W. Brain et al.

It is certified that error appears in the above-identified patent and that said Letters Patent is hereby corrected as shown below:

Column 28, Line 39. should read as follows:

an orientation perpendicular to the quilt-based user interface,

Signed and Sealed this

Thirteenth Day of April, 2010

David J. Kappos
*Director of the United States Patent and Trademark Office*

UNITED STATES PATENT AND TRADEMARK OFFICE
CERTIFICATE OF CORRECTION

PATENT NO. : 7,600,243 B2  Page 1 of 1
APPLICATION NO. : 11/392259
DATED : October 6, 2009
INVENTOR(S) : Brain et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 632 days.

Signed and Sealed this

Fifth Day of October, 2010

David J. Kappos
*Director of the United States Patent and Trademark Office*